(12) United States Patent
Czerwinski et al.

(10) Patent No.: US 6,188,405 B1
(45) Date of Patent: Feb. 13, 2001

(54) METHODS, APPARATUS AND DATA STRUCTURES FOR PROVIDING A USER INTERFACE, WHICH EXPLOITS SPATIAL MEMORY, TO OBJECTS

(75) Inventors: Mary Czerwinski, Woodinville; Susan T. Dumais, Kirkland, both of WA (US); Susan E. Dziadosz, Ann Arbor, MI (US); Daniel C. Robbins; George G. Robertson, both of Seattle, WA (US); David D. Thiel, Redmond, WA (US); Maarten Van Dantzich, Seattle, WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/152,525

(22) Filed: Sep. 14, 1998

(51) Int. Cl.⁷ ..................................................... G06F 3/14
(52) U.S. Cl. .......................... 345/339; 345/348; 345/349; 345/335; 345/968
(58) Field of Search ...................... 345/339, 348, 345/349, 351, 145, 968, 335, 334, 333, 428; 707/104, 6; 709/302, 328

(56) References Cited

U.S. PATENT DOCUMENTS

| | | | |
|---|---|---|---|
| 5,060,135 | * 10/1991 | Levine et al. | 345/351 |
| 5,161,213 | * 11/1992 | Knowlton | 345/428 |
| 5,276,785 | 1/1994 | Mackinlay et al. | 395/127 |
| 5,295,243 | 3/1994 | Robertson et al. | 395/160 |
| 5,333,254 | 7/1994 | Robertson | 395/155 |
| 5,339,390 | 8/1994 | Robertson et al. | 395/157 |
| 5,359,703 | 10/1994 | Robertson et al. | 395/119 |
| 5,384,908 | 1/1995 | Mackinlay et al. | 395/152 |
| 5,465,327 | * 11/1995 | Wang et al. | 345/349 X |
| 5,513,303 | 4/1996 | Robertson et al. | 395/119 |
| 5,530,235 | 6/1996 | Stefik et al. | 389/670 |
| 5,608,850 | 3/1997 | Robertson | 395/127 |
| 5,670,984 | 9/1997 | Robertson et al. | 345/139 |
| 5,689,287 | 11/1997 | Mackinlay et al. | 345/427 |
| 5,689,628 | 11/1997 | Robertson | 395/127 |
| 5,754,179 | * 5/1998 | Hocker et al. | 345/348 |
| 5,767,826 | 6/1998 | Sheridon et al. | 345/84 |
| 5,847,709 | * 12/1998 | Card et al. | 345/351 X |
| 5,973,692 | * 10/1999 | Knowlton et al. | 345/348 |
| 6,002,399 | * 12/1999 | Haine et al. | 345/348 |

OTHER PUBLICATIONS

"Dynamic Diagrams", *Products Introducing MAPA*, MAPA™, downloaded from http://www.dynamicdiagrams.com/products.html on Jul. 7, 1998.

(List continued on next page.)

Primary Examiner—Raymond J. Bayerl
(74) Attorney, Agent, or Firm—Straub & Pokotylo; John C. Pokotylo

(57) ABSTRACT

A graphical user interface in which object thumbnails, as scaled images, are rendered on a two-dimensional wall or screen, and which exploits spatial memory. The objects may be moved, continuously, on the surface with a two-dimensional input device. Pop-up title bars may be rendered over active objects. Intelligent help may be provided to the user, as visual indicators, based on proximity clustering or based on matching algorithms.

63 Claims, 41 Drawing Sheets

(30 of 41 Drawing Sheet(s) Filed in Color)

OTHER PUBLICATIONS

"Maya Design Group", *Our Portfolio: Case Study*, Digital Equipment Corporation—Workscape™, downloaded from http://www.maya.com/Portfolio/workscape.html on Jul. 7, 1998.

M. Heydt, "Incorporating the Webbrowser Control into your Program", *Microsoft Interactive Developer, The Microsoft Magazine for Web Developers*, vol. 3, No. 7, pp. 42–51 (Jul. 1998).

R.R. Hightower et al, "Graphical Multiscale Web Histories: A Study of PadPrints", *Hyper Text 98*, pp. 58–65, © 1998.

S.K. Card et al, "The WebBook and the Web Forager: An Information Workspace for the World–Wide Web", CHI 96 Conference Proceedings, Vancouver, BC, Canada (Apr. 13–18, 1996).

R.L. Kullberg, "Dynamic Timelines Visualizing Historical Information in Three Dimensions", Masters Thesis, B.S. Environmental Science, Massachusetts Institute of Technology, Cambridge, MA, (1995).

J.E. Ball et al, "ReActor: A System for Real–Time, Reactive Animations", *Conference Companion, CHI '94*, Boston, MA, pp. 39–40 (Apr. 24–28, 1994).

J.M. Ballay, MAYA Design Group, "Designing Workscape™: An Interdisciplinary Experience", *Human Factors in Computing Systems*, CHI '94 —"Celebrating Interdepence", pp. 10–15 (Apr. 24–28, 1994).

G.G. Robertson et al, "Information Visualization Using 3D Interactive Animation", *Communications of the ACM*, vol. 36, No. 4, pp. 57–71 (Apr. 1993).

R. Mander et al, Human Interface Group, Advanced Technology, Apple Computer, Inc., "A 'Pile' Metaphor for Supporting Casual Organization of Information", CHI '92, pp. 627–634 (May 3–7, 1992).

R. Rao et al, "The Information Grid: A Framework for Information Retrieval and Retrieval–Centered Applications", *UIST '92*, pp. 23–32 (Nov. 15–18, 1992).

* cited by examiner

1100

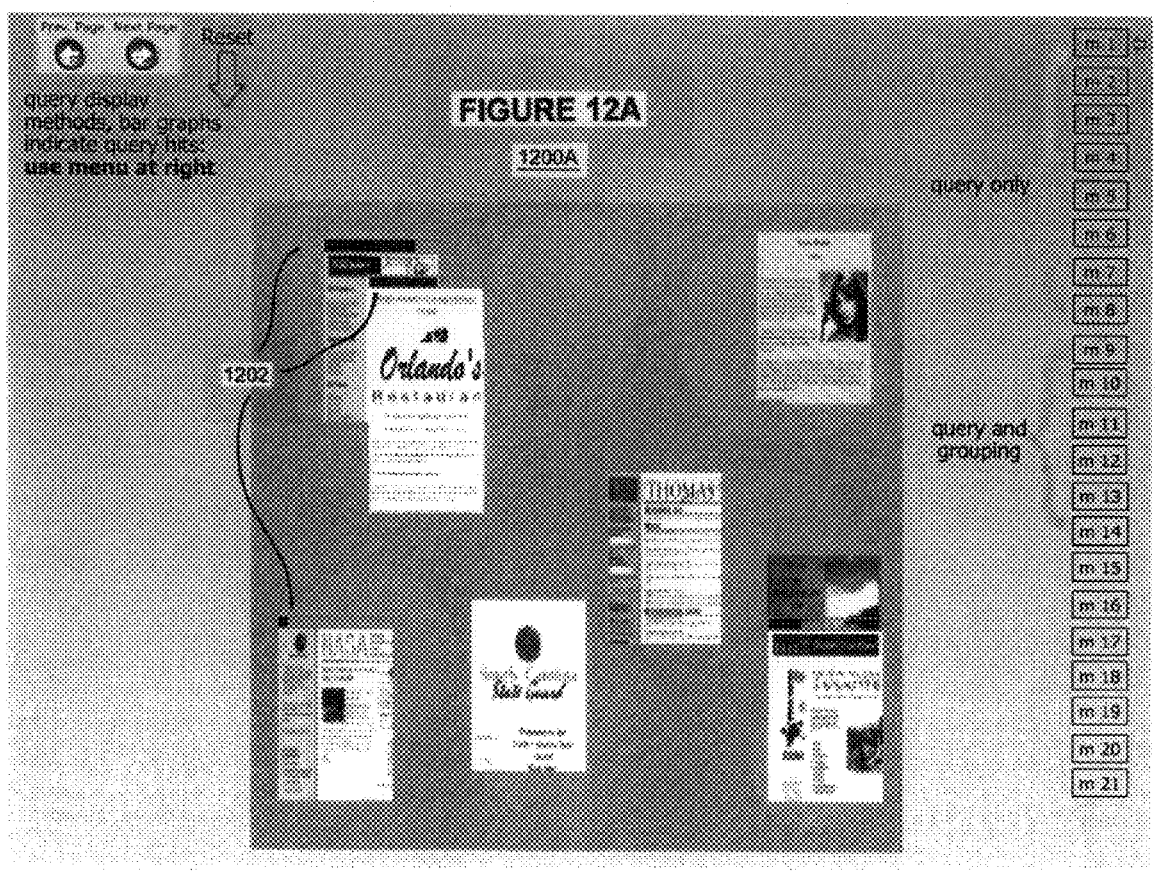

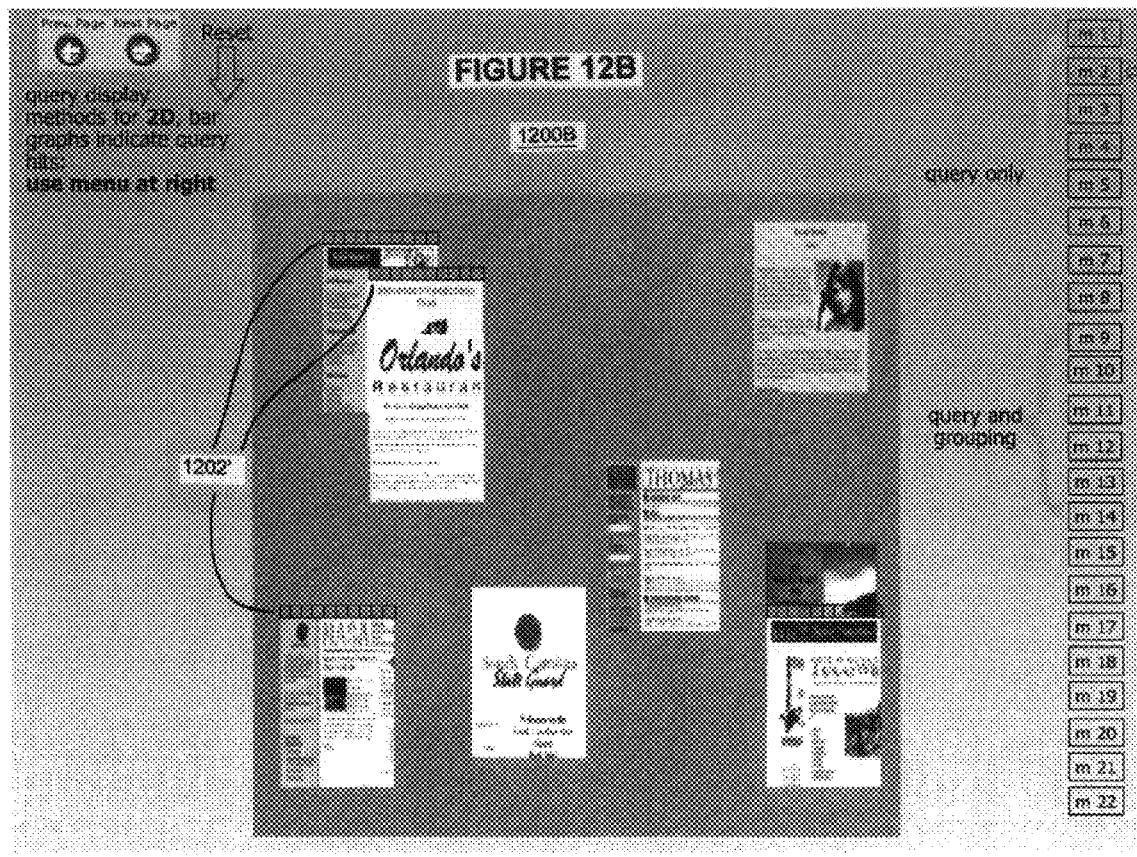

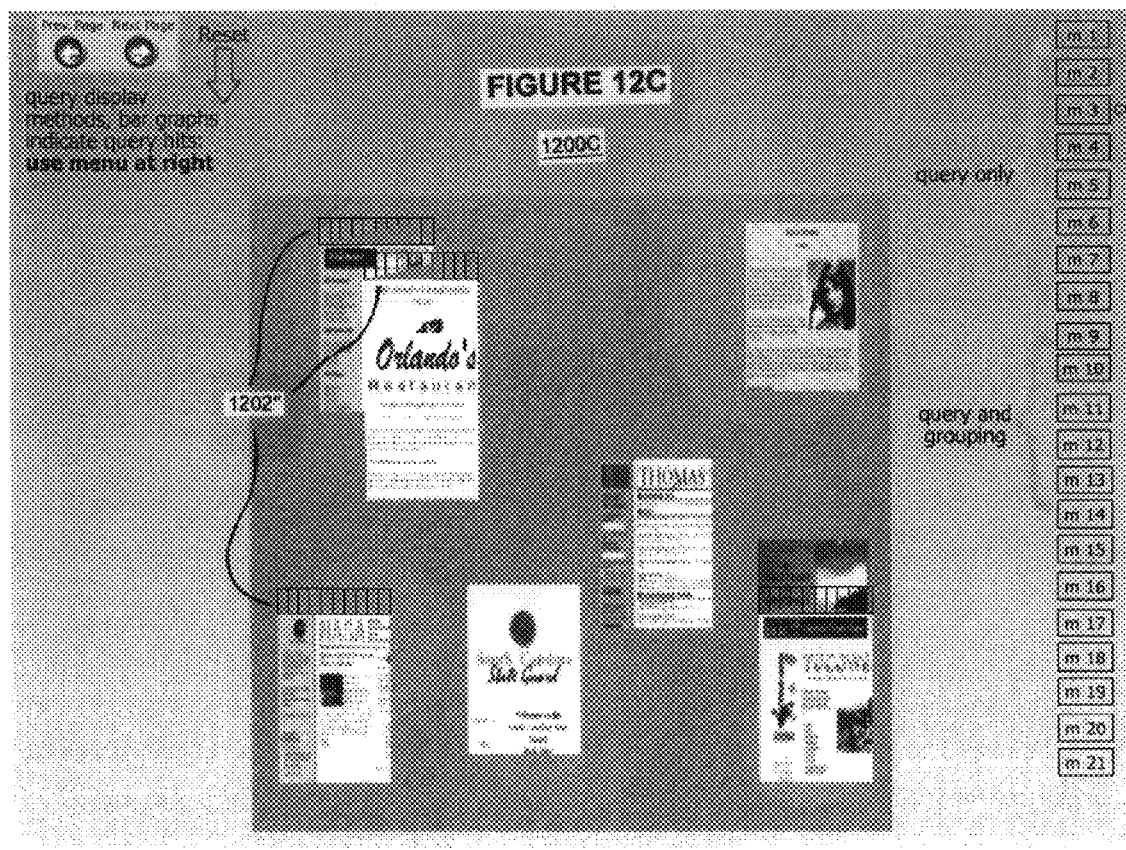

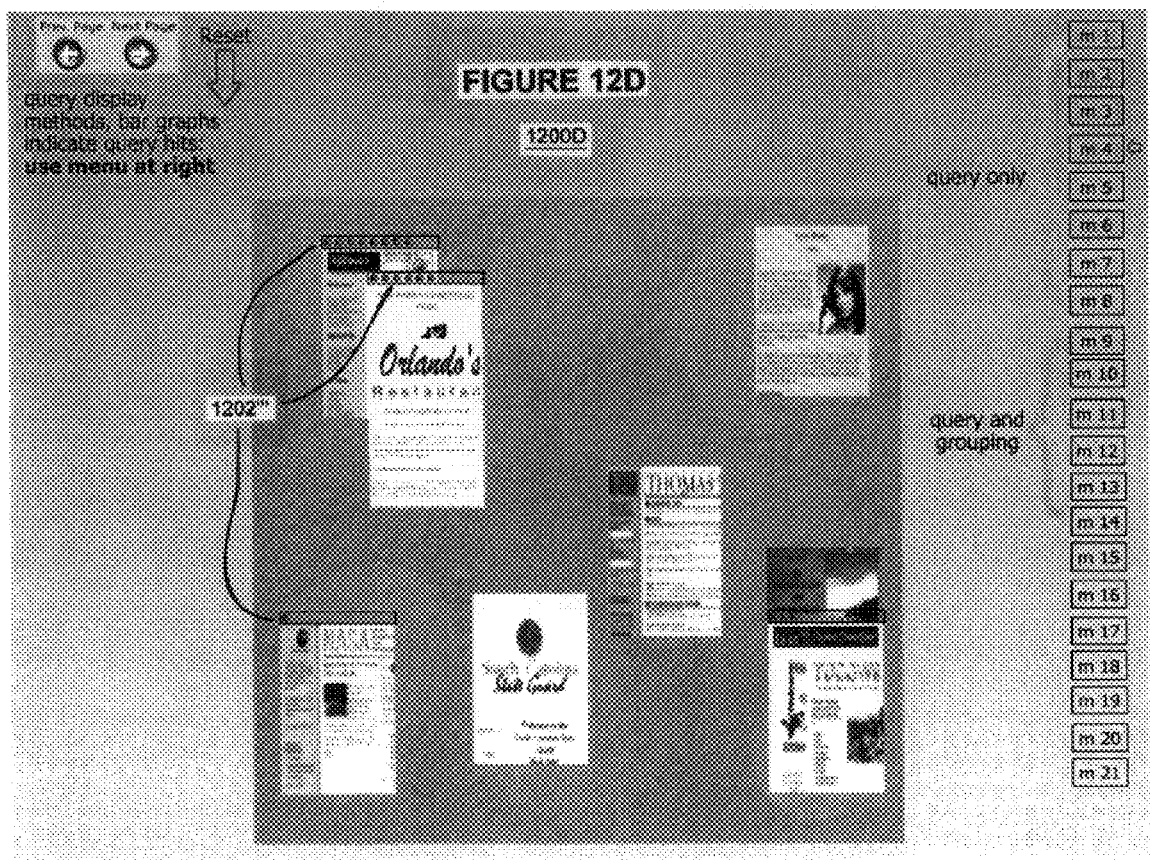

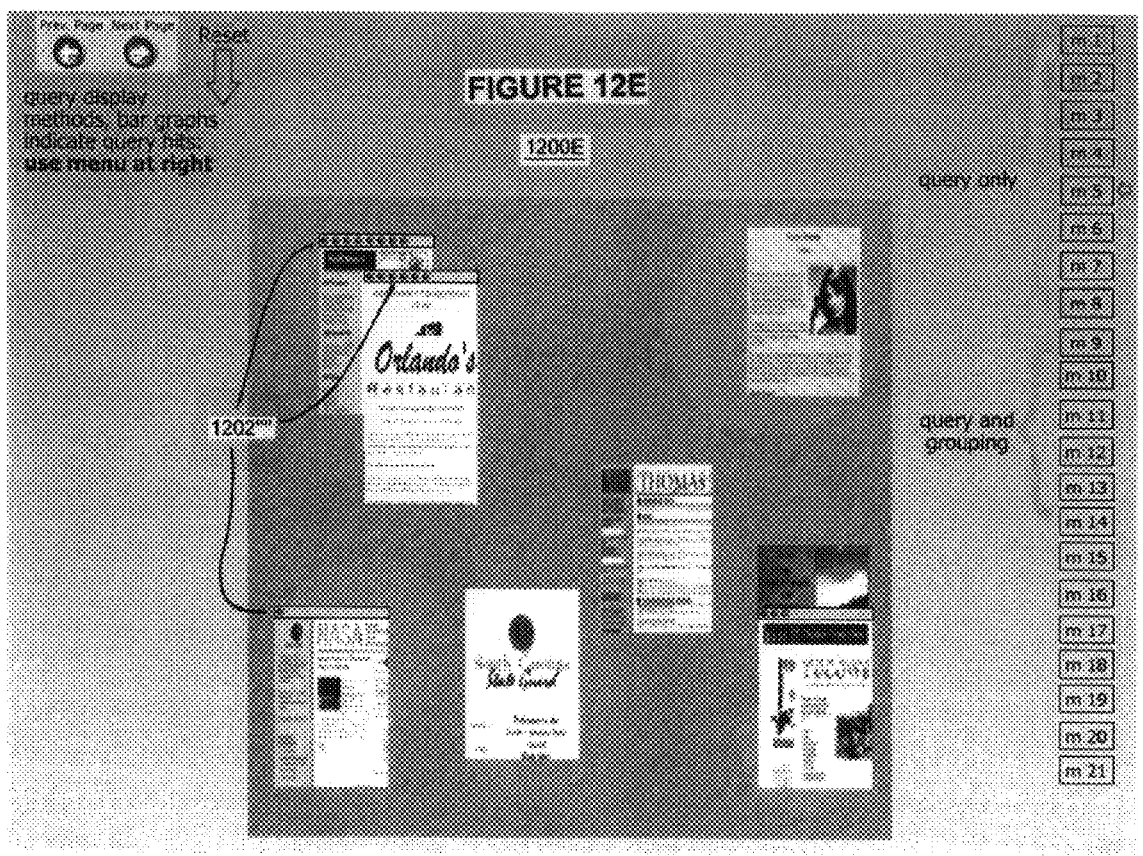

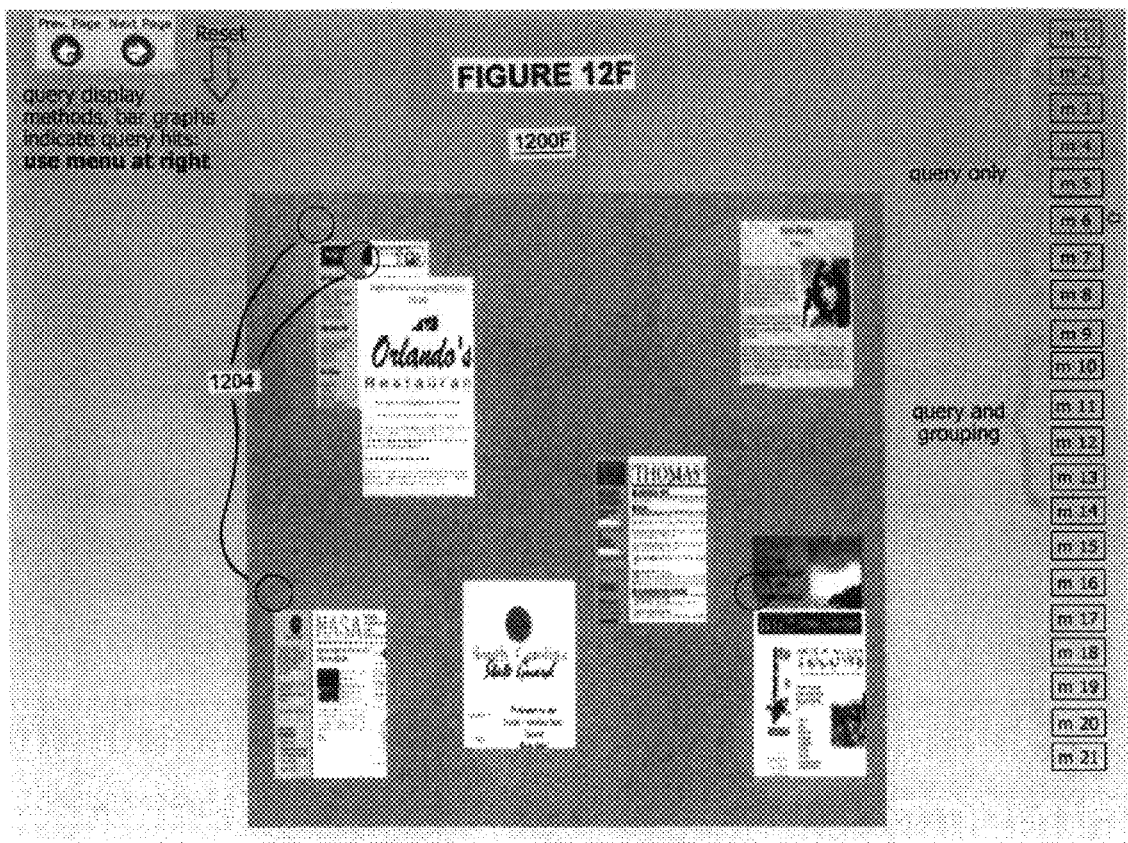

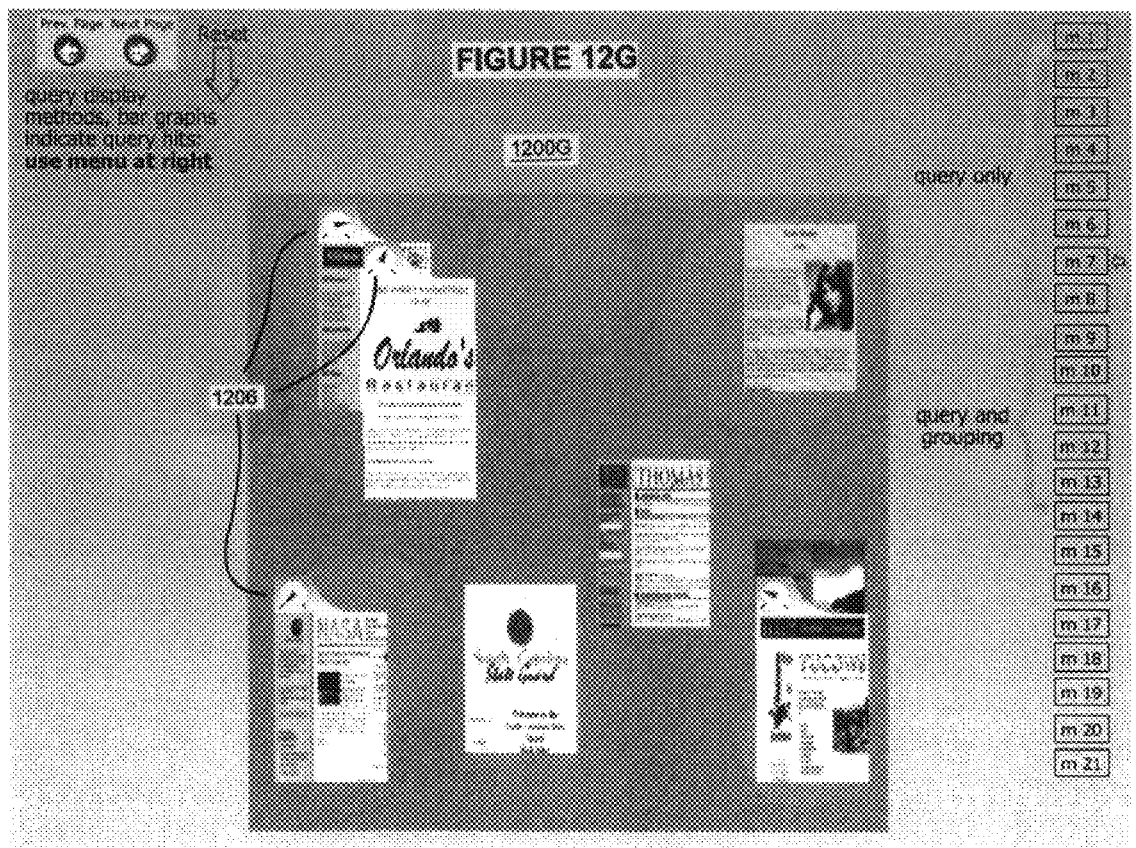

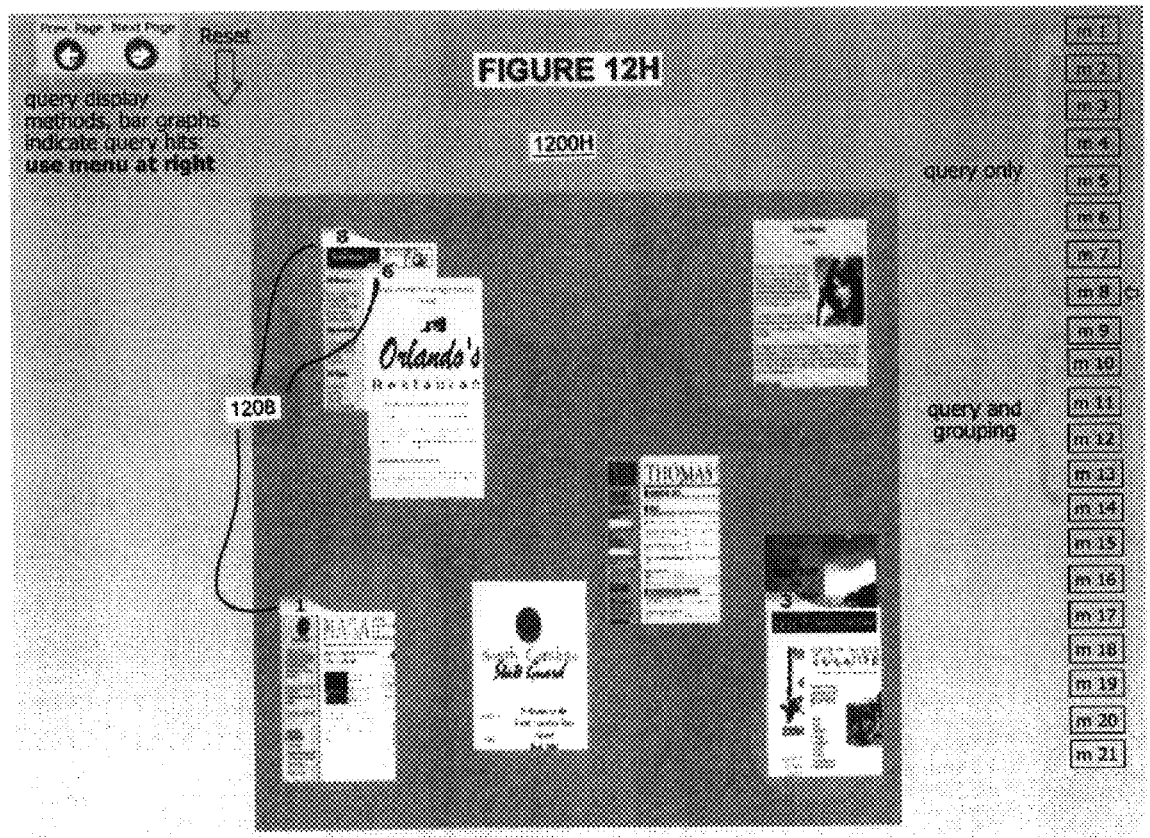

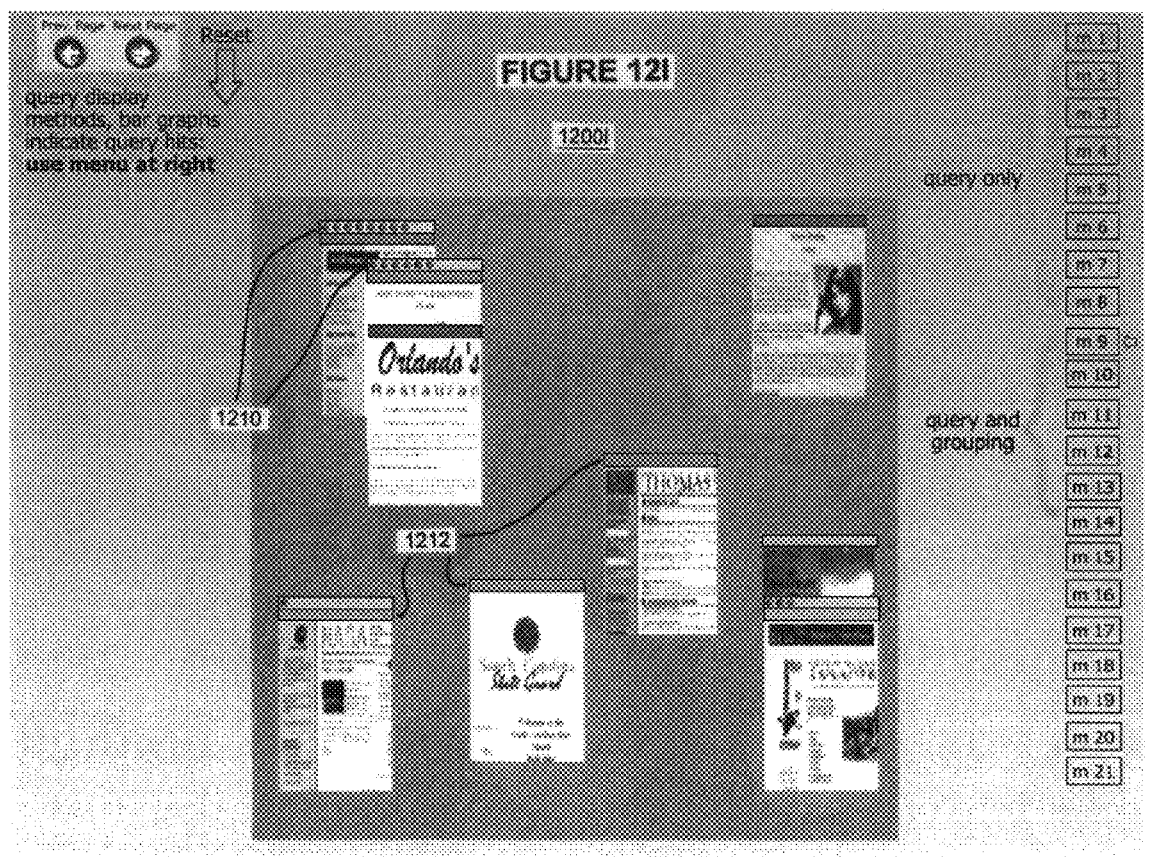

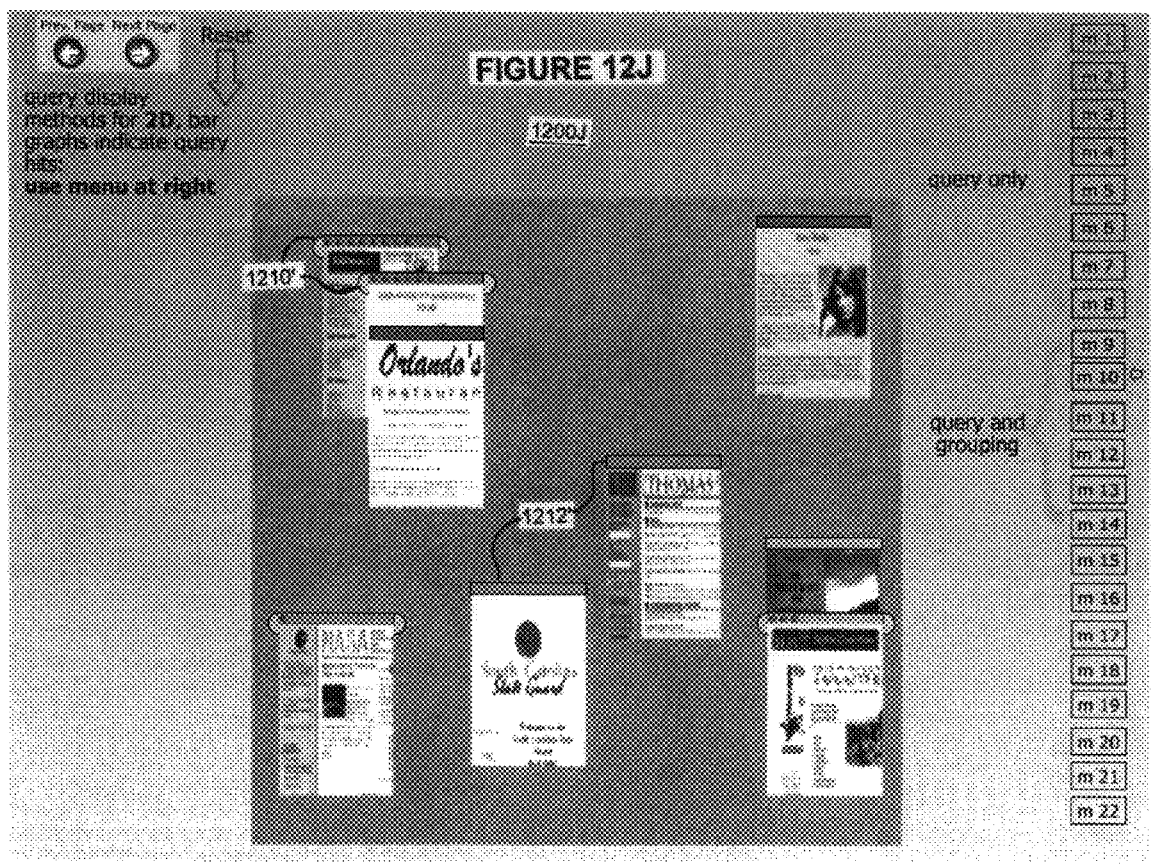

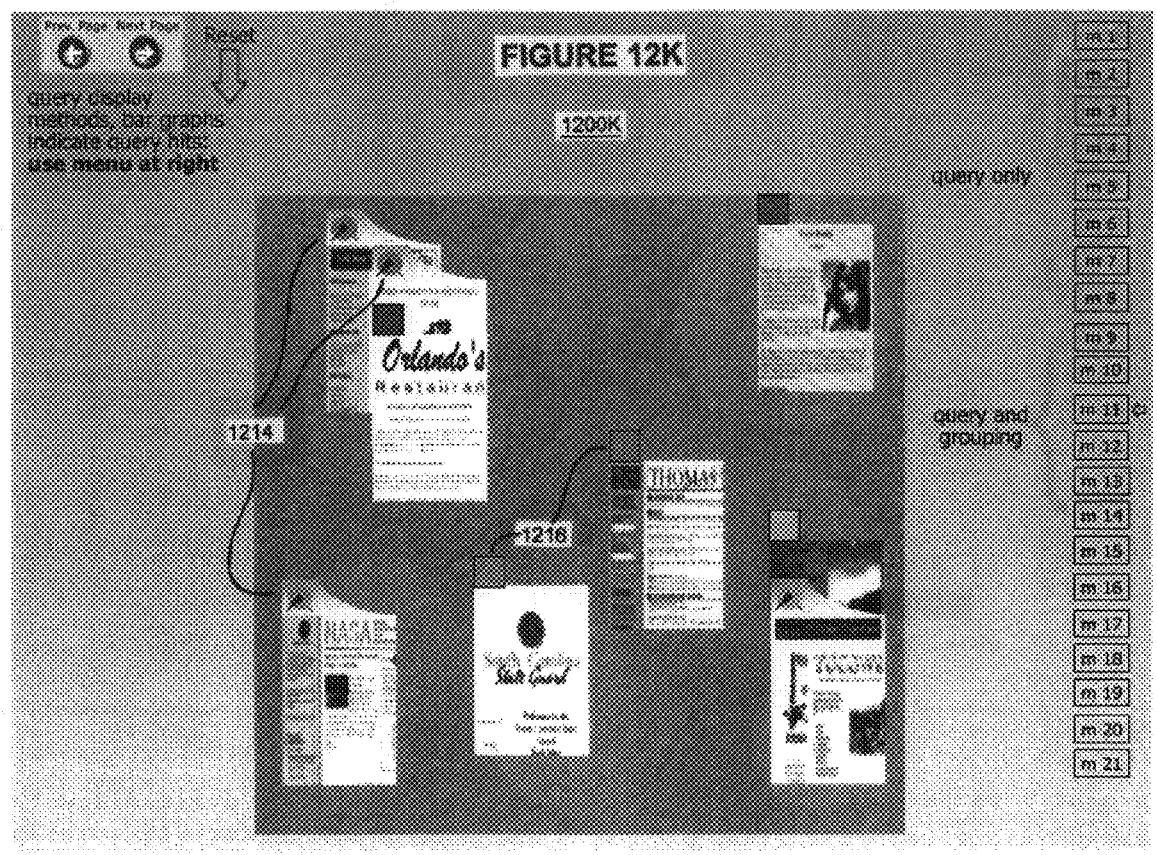

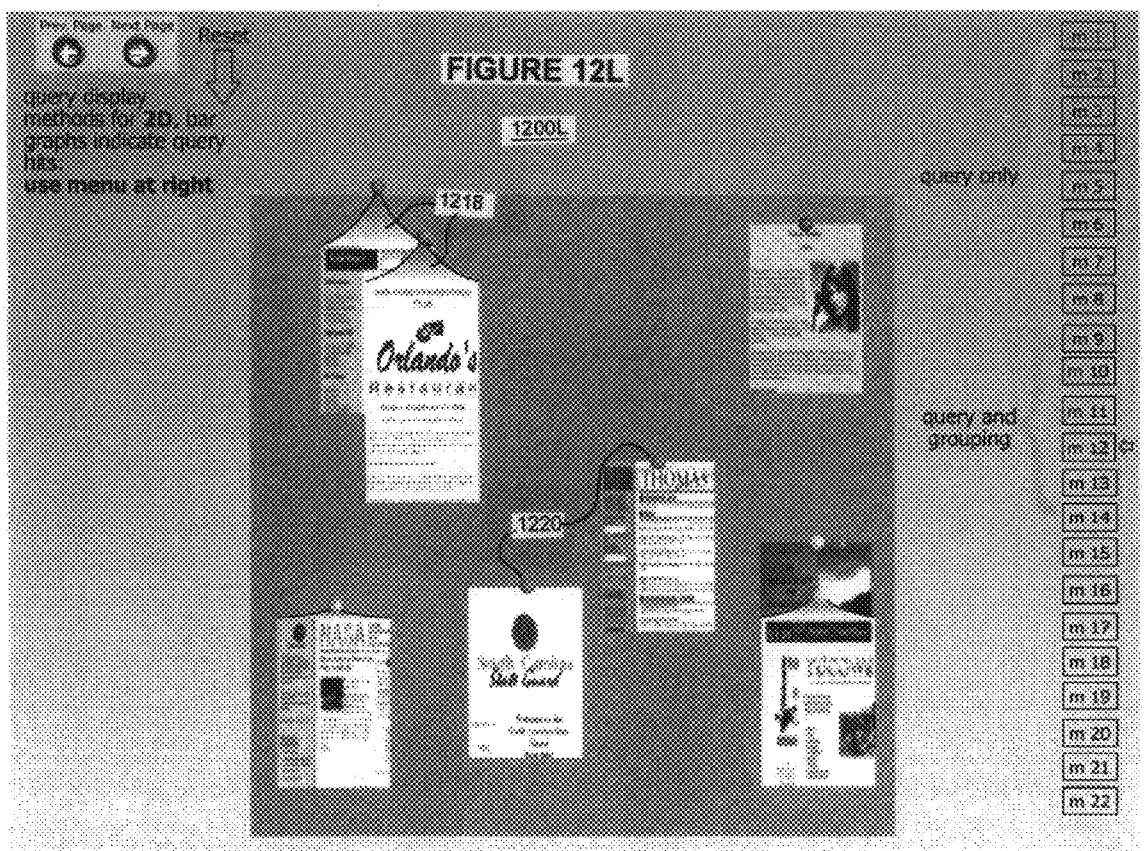

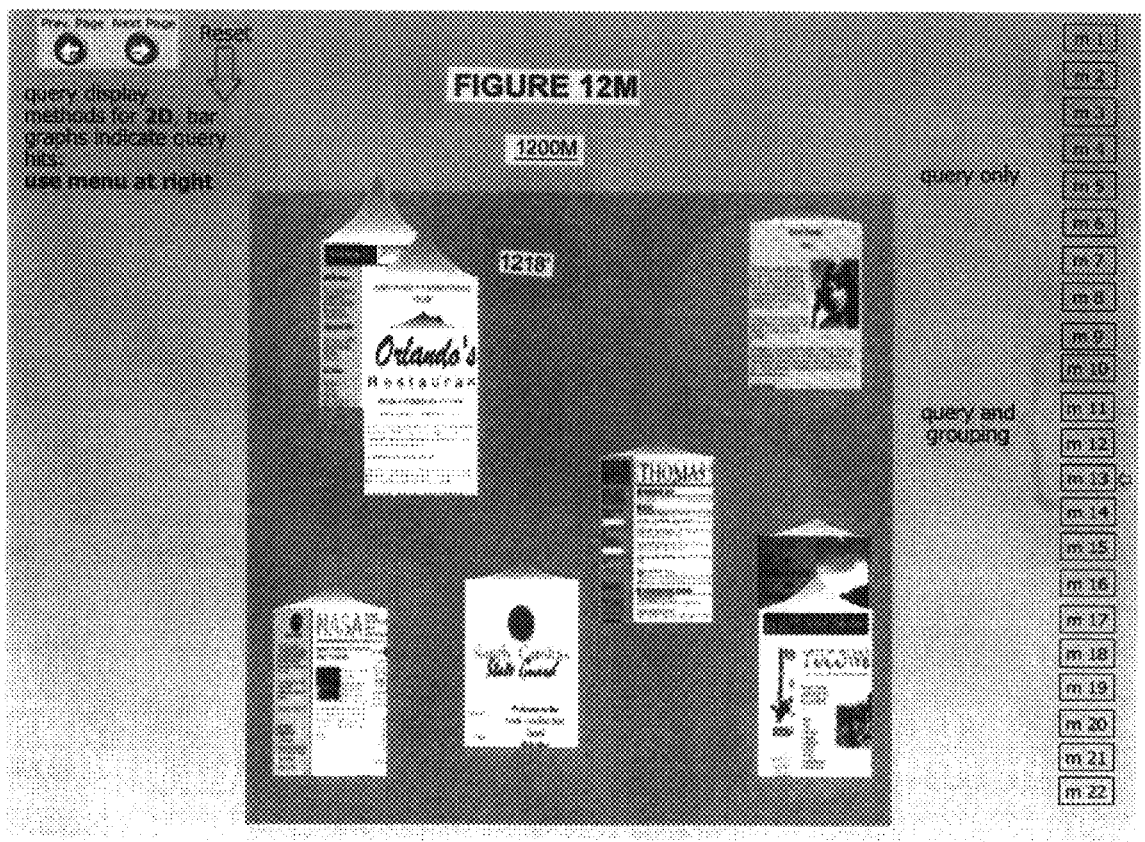

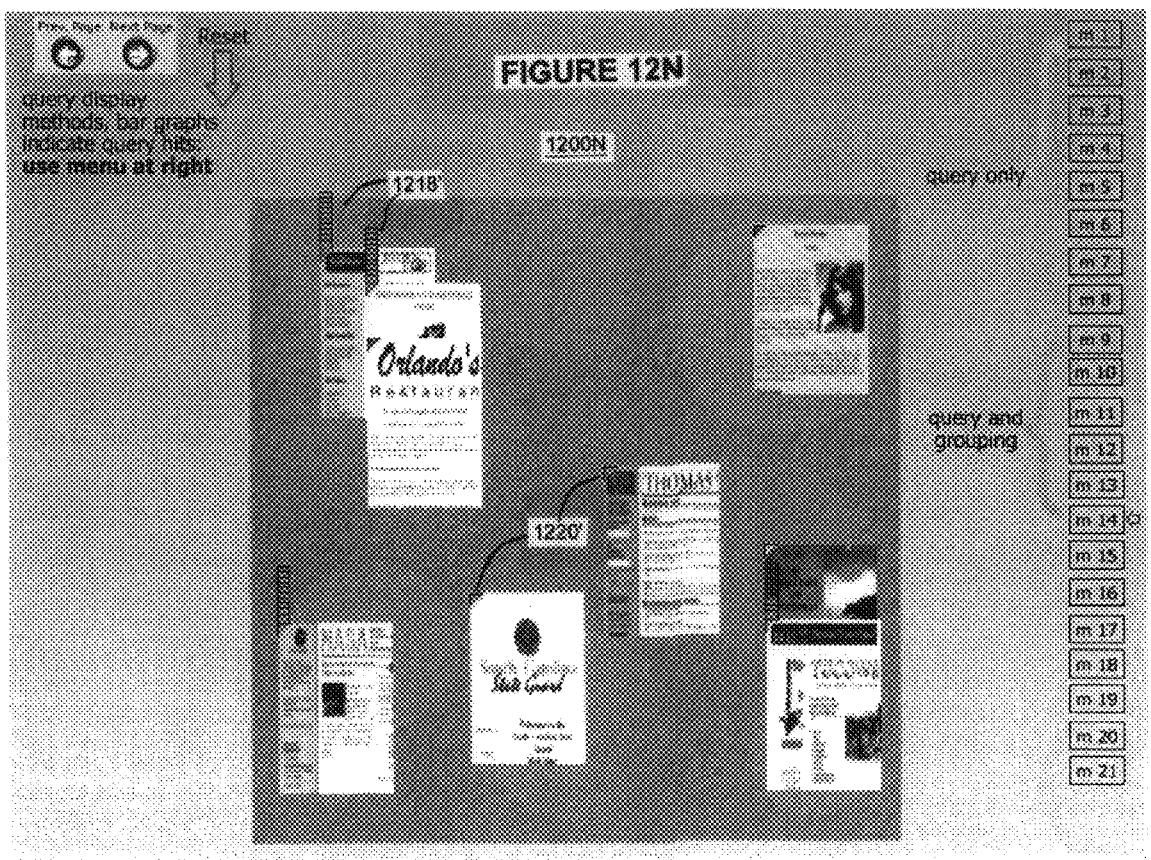

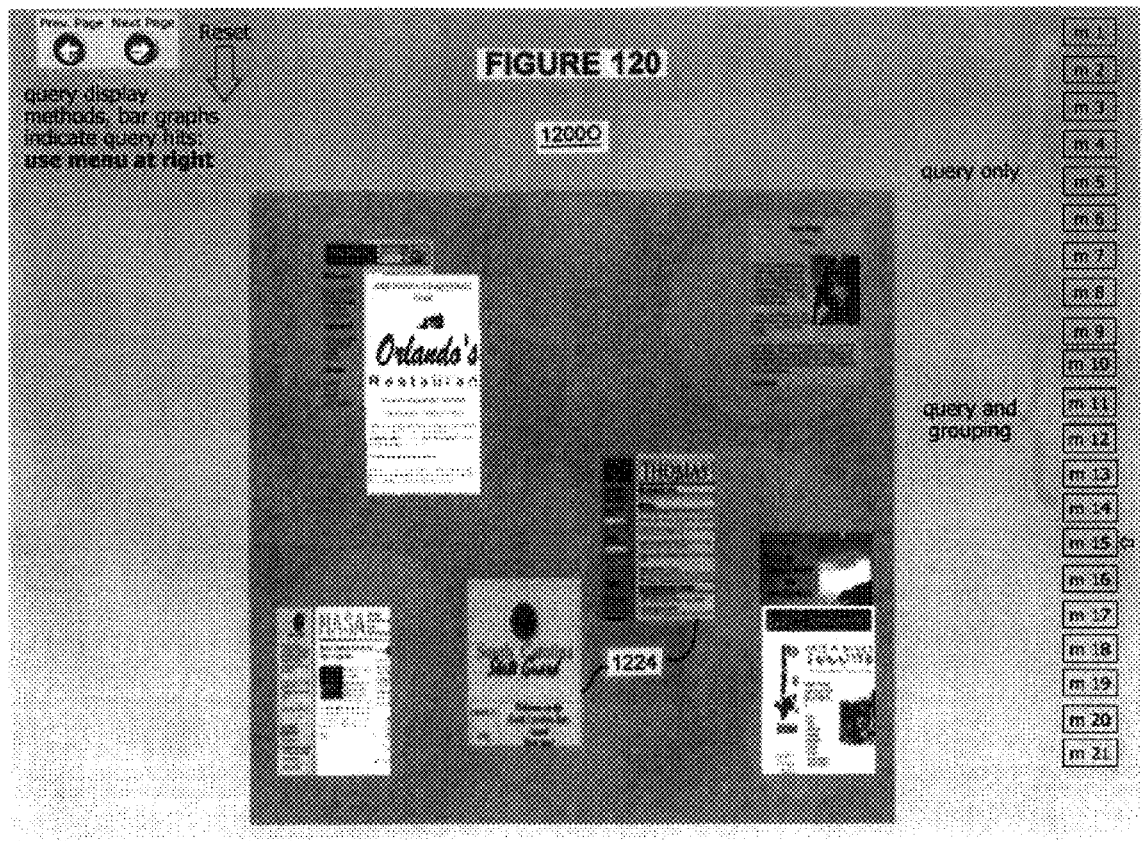

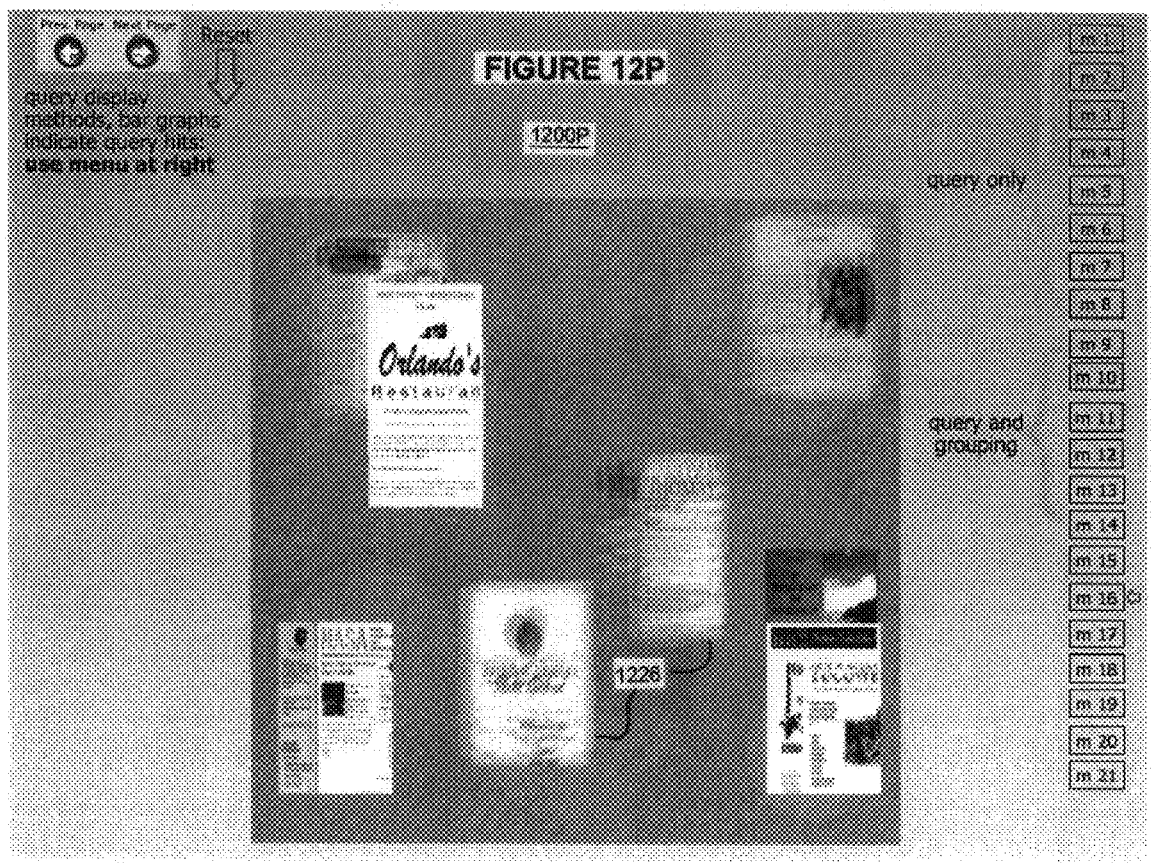

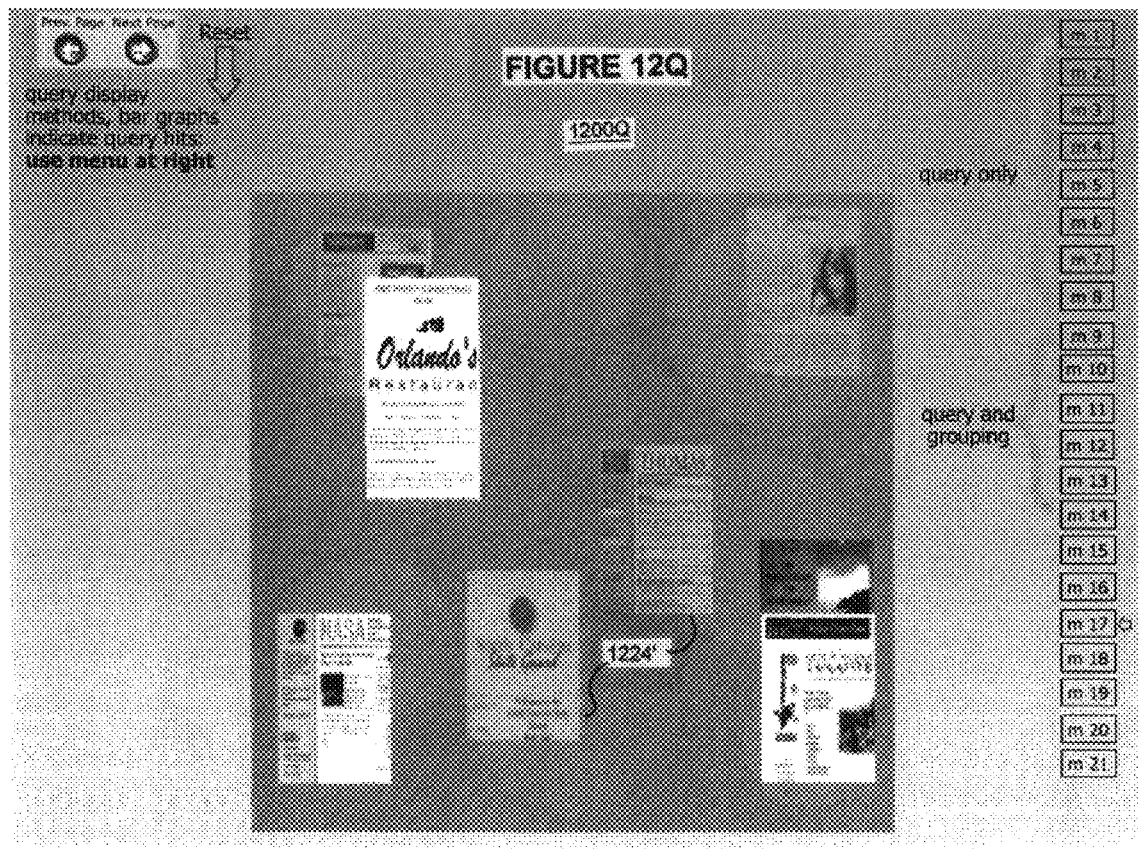

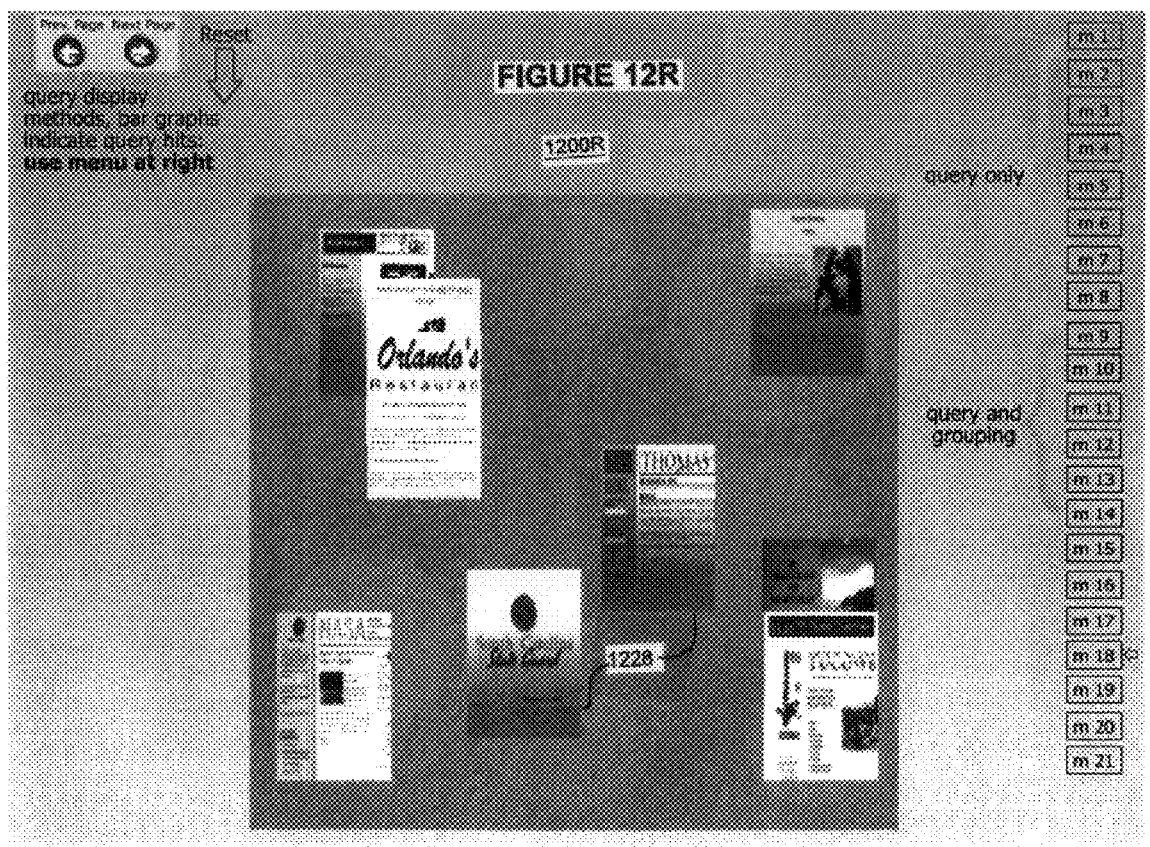

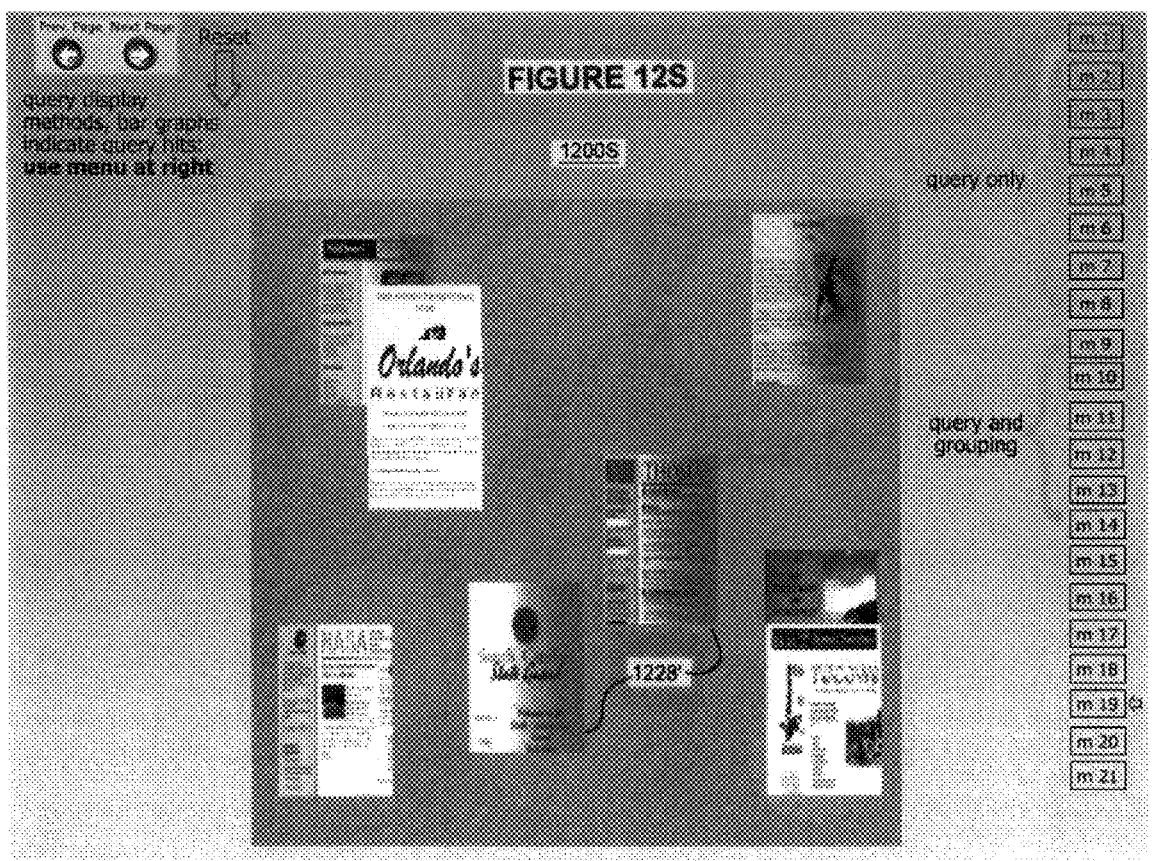

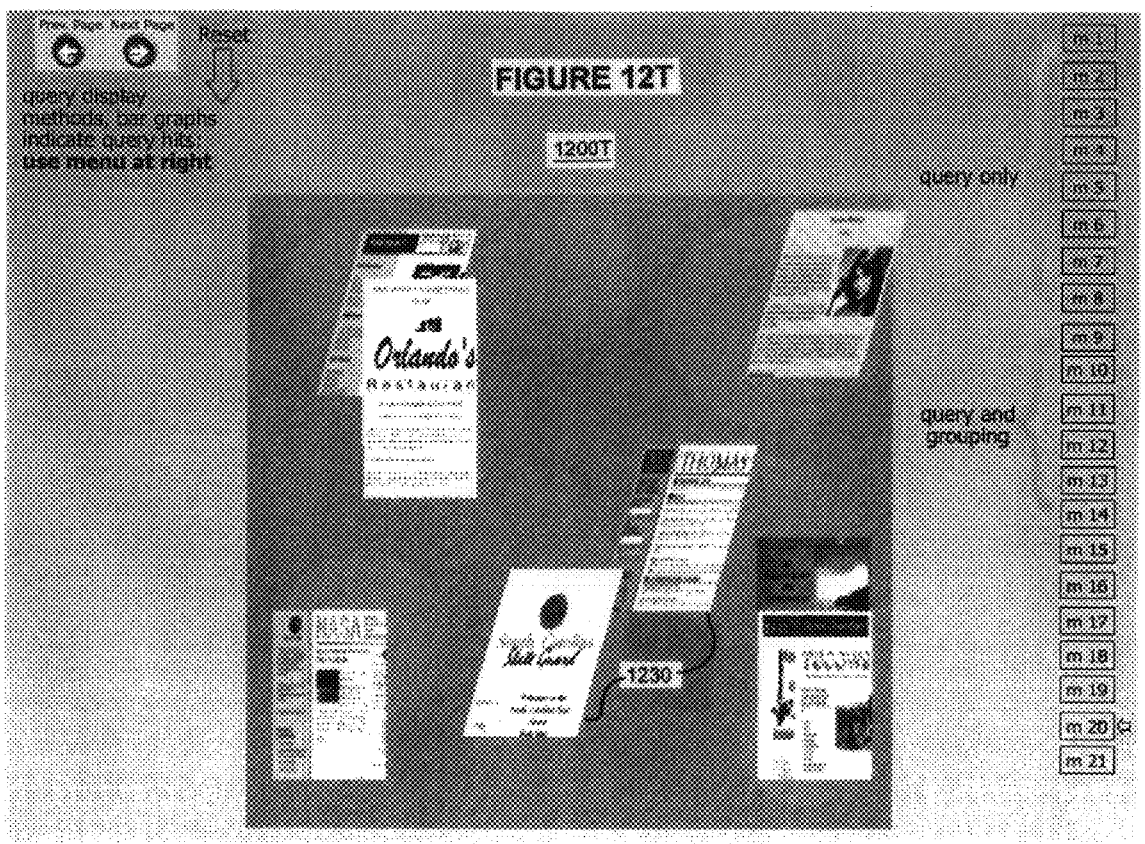

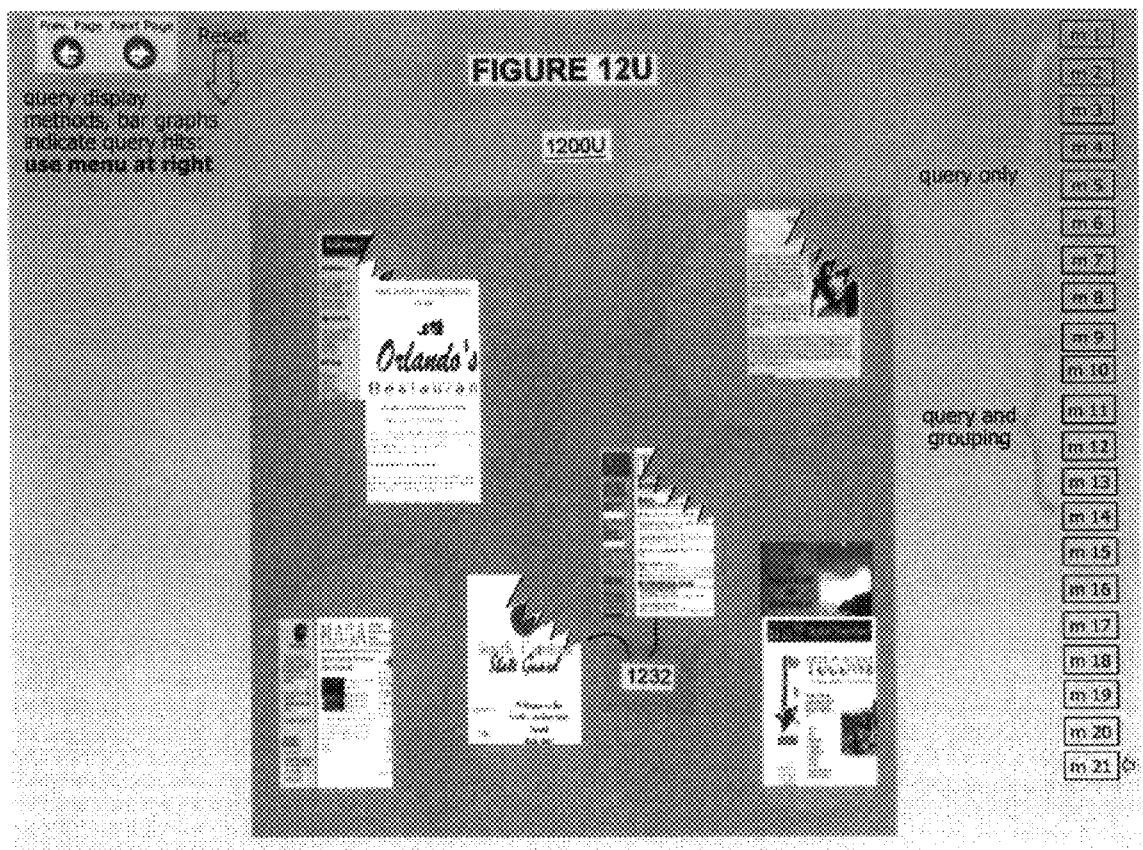

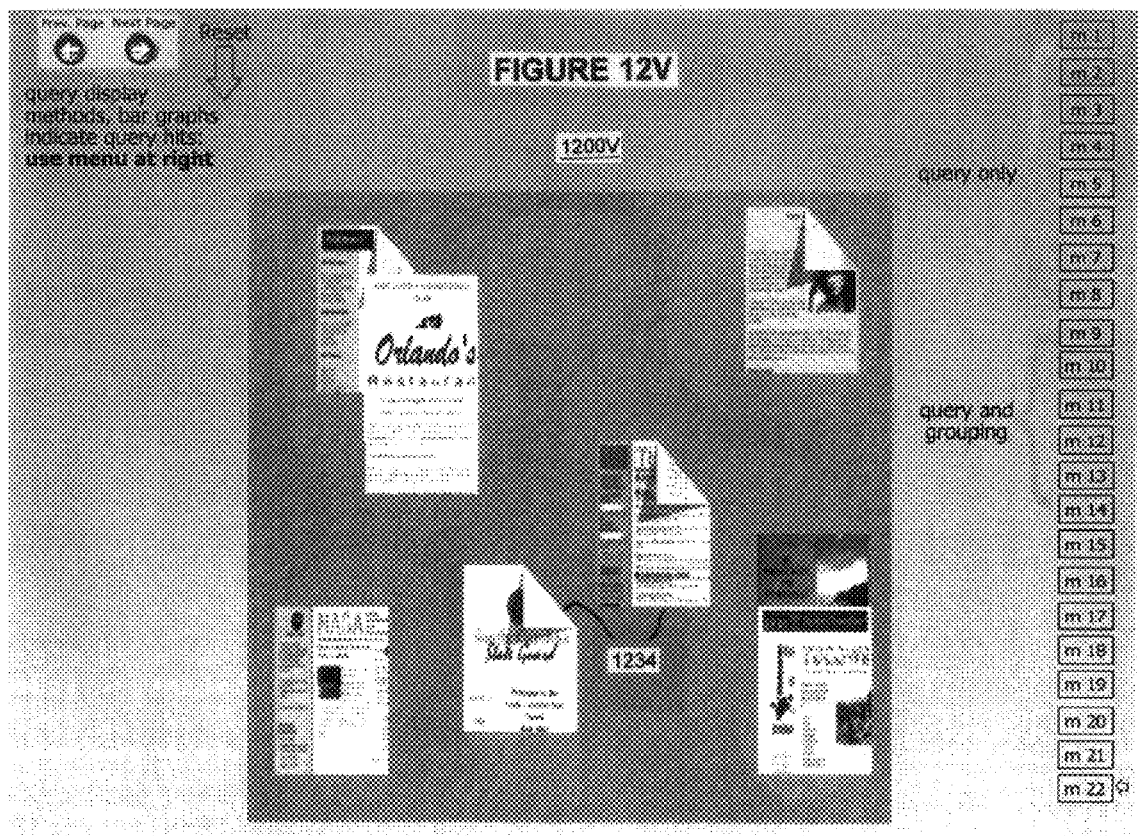

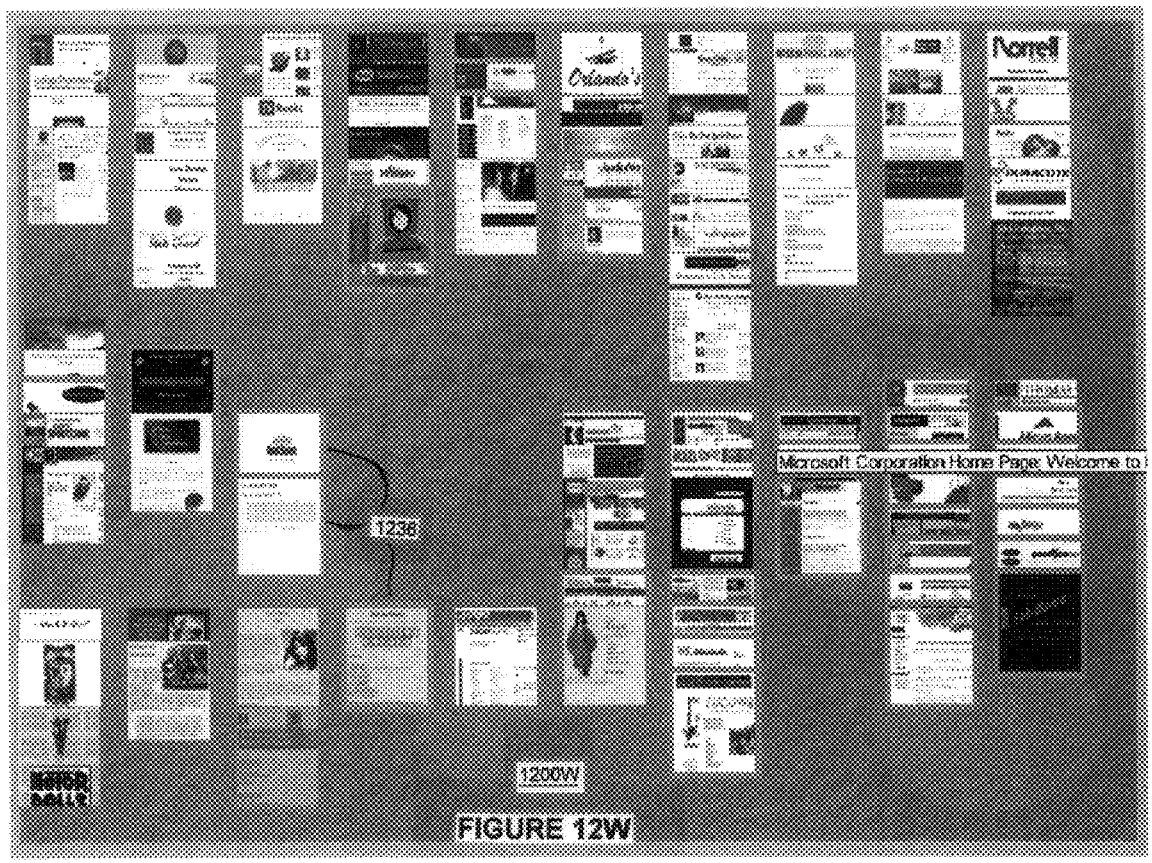

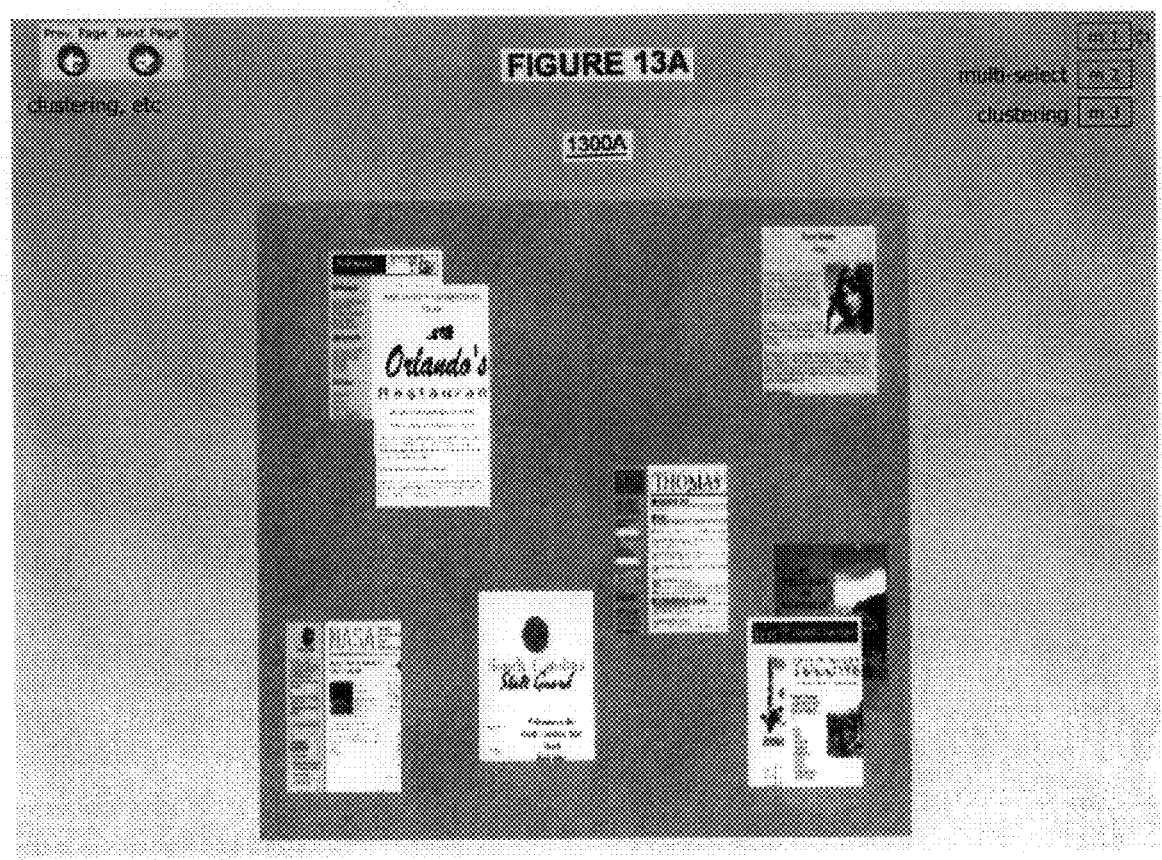

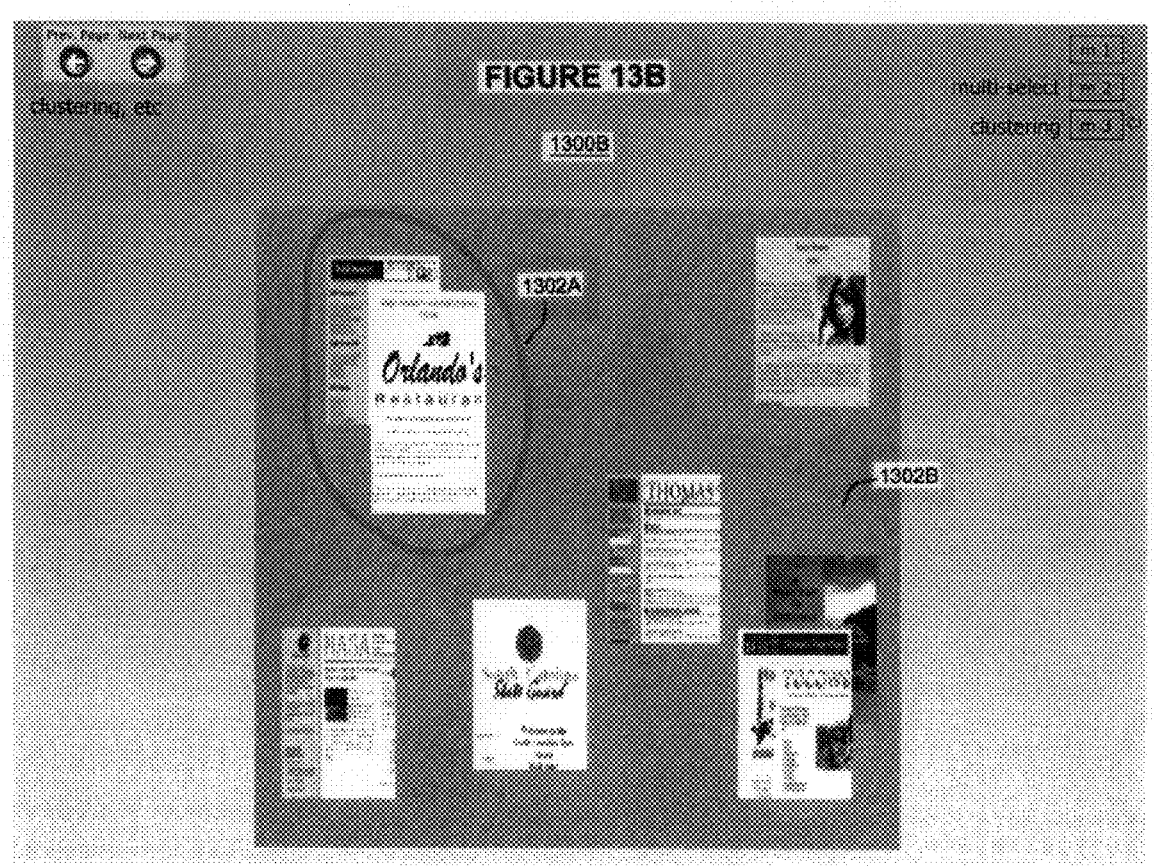

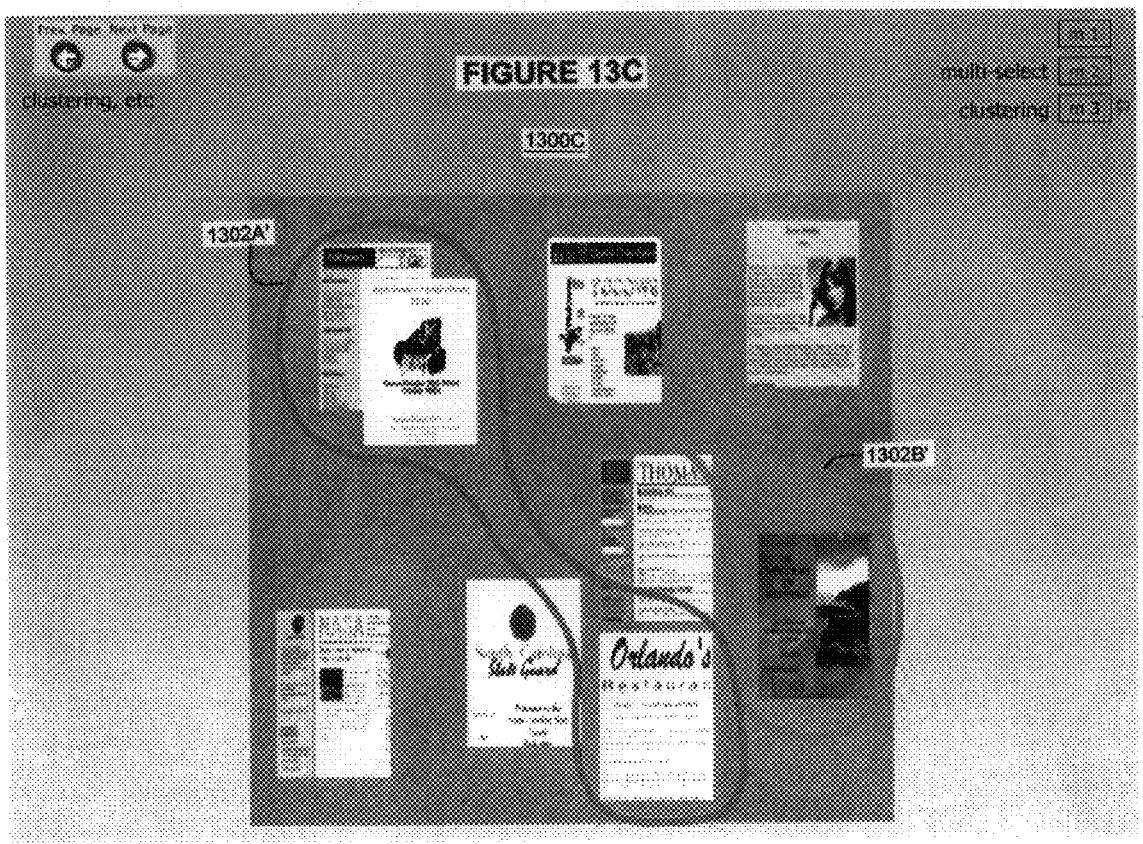

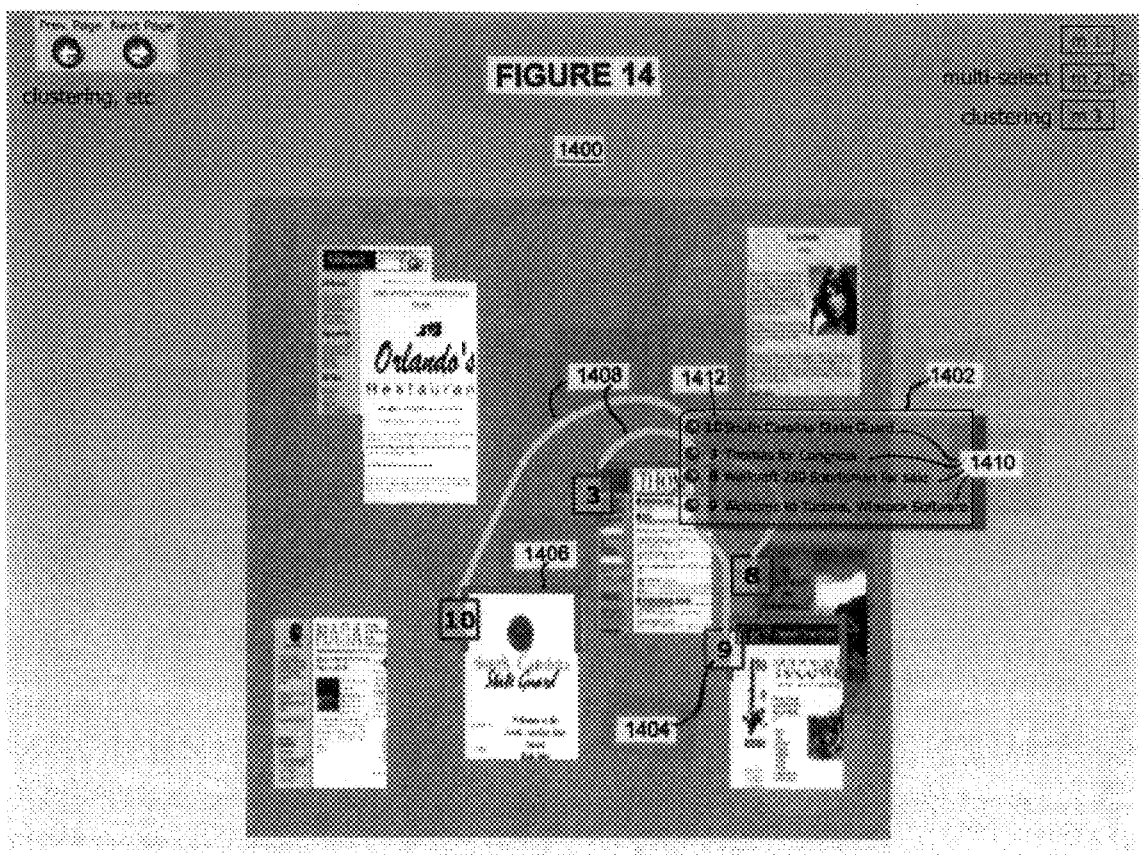

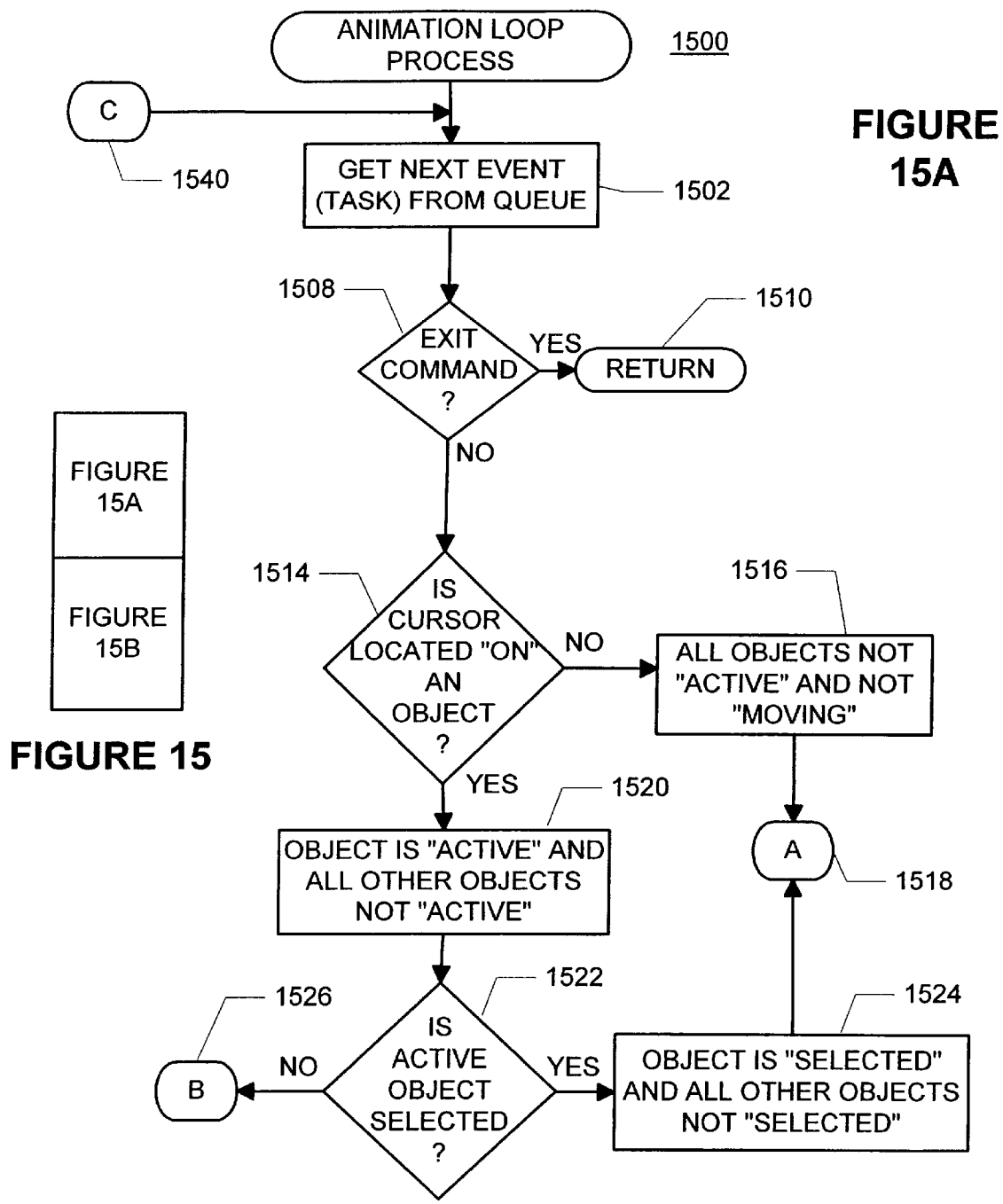

METHODS, APPARATUS AND DATA STRUCTURES FOR PROVIDING A USER INTERFACE, WHICH EXPLOITS SPATIAL MEMORY, TO OBJECTS

§ 1. BACKGROUND OF THE INVENTION

§ 1.1 Field of the Invention

The present invention concerns a user interface to objects, such as informational objects for example, which are stored on, or accessed via, a machine such as a computer for example. The present invention exploits the spatial memory of people.

§ 1.2 Related Art

A brief history of user interfaces is provided below. First, known user interfaces are introduced in § 1.2.1. Then, user interfaces which facilitate information access, rather than information processing, are introduced in § 1.2.2. Finally, needs of users which have not yet been met by user interfaces are listed in § 1.2.3.

§ 1.2.1 KNOWN USER INTERFACES

The way in which people interact with computing machines has evolved over the last 50 or so years. Initially, these machines were typically used as information processors, and in particular, for performing mathematical operations on numbers. People interacted with such early computing machines by punching and ordering cards to effect a sequence of commands. In later computing machines, also typically used to perform mathematical operations on numbers, people interacted with such computing machines by setting switches and viewing light emitting diodes to enter commands. With the advent of the desktop personal computer, people-machine interaction evolved from the use a keyboard to enter lines of commands, discussed in § 1.2.1.1 below, to the use of a keyboard and mouse to manipulate icon metaphors of the real world, discussed in § 1.2.1.2 below.

§ 1.2.1.1 COMMAND LINES

Early personal computers were also used to perform mathematical operations, from engineering applications to accounting applications (e.g., spreadsheets). In addition, such early personal computers were used to enter, store, and manipulate information, such as with word processing applications for example, and to effectively access stored information, such as with relational database applications for example. People typically interacted with such computers by entering commands, in accordance with fairly rigid syntactical rules, or by entering data via a keyboard and viewing results via a video monitor. Unfortunately, since the syntactical rules for interacting with a personal computer were typically not intuitive, people would have to invest a fairly substantial amount of time to master effective interaction with the computer. Until they mastered the syntactical rules, people would often become frustrated when using computers. Casual users would often conclude that learning to interact with computers would not be worth their time. Thus, computer use was usually limited to professionals (e.g., accountants, engineers, and scientists) who needed the computational power of personal computers, and to hobbyists.

§ 1.2.1.2 GRAPHICAL USER INTERFACES

The advent of graphical user interfaces (or "GUIs") provided a more intuitive way for people to interact with computers. The casual user no longer needed to learn syntactical rules and enter sequences of commands. As personal computers penetrated business to an ever greater degree, probably due to popular and time saving word processing and spreadsheet applications, operating systems began to employ user interfaces which used a office metaphor which included documents, folders, filing cabinets, trash cans, telephone directories, etc. These so-called desktop GUIs have served their users well over the past decade or so. However, in addition to using computers for data entry, storage, and manipulation, people are using computers for access to information to an ever increasing degree. This recent trend is discussed in § 1.2.2 below.

§ 1.2.2 MIGRATION FROM INFORMATION PROCESSING AND DESKTOP METAPHOR TO INFORMATION ACCESS

In recent decades, and in the past five (5) to ten (10) years in particular, computers have become interconnected by networks by an ever increasing extent; initially, via local area networks (or "LANs"), and more recently via LANs, private wide area networks (or "WANs") and the Internet. The proliferation of networks, in conjunction with the increased availability of inexpensive data storage means, has afforded computer users unprecedented access to a wealth of content. Such content may be presented to a user (or "rendered") in the form of text, images, audio, video, etc.

The Internet is one means of inter-networking local area networks and individual computers. The popularity of the Internet has exploded in recent years. Many feel that this explosive growth was fueled by the ability to link (e.g., via Hyper-text links) resources (e.g., World Wide Web pages) so that users could seamlessly transition from various resources, even when such resources were stored at geographically remote resource servers. More specifically, the Hyper-text markup language (or "HTML") permits documents to include hyper-text links. These hyper-text links, which are typically rendered in a text file as text in a different font or color, include network address information to related resources. More specifically, the hyper-text link has an associated uniform resource locator (or "URL") which is an Internet address at which the linked resource is located. When a user activates a hyper-text link, for example by clicking a mouse when a displayed cursor coincides with the text associated with the hyper-text link, the related resource is accessed, downloaded, and rendered to the user. The related resource may be accessed by the same resource server that provided the previously rendered resource, or may be accessed by a geographically remote resource server. Such transiting from resource to resource, by activating hyper-text links for example, is commonly referred to as "surfing".

Although people continue to use computers to enter information, manipulate information, and store information, in view of the foregoing developments people are using computers to access information to an ever increasing extent. In a departure from the past, the information people want to access is often not created by them (which would typically reside on the person's desktop computer), or even by a company or group to which that person belongs (which would typically reside on a storage server, accessible via a local area network). Rather, given the world wide breadth of the Internet, the information people want to access is usually created by unrelated third parties (or content providers). Unfortunately, GUIs using a desktop metaphor are not particularly well suited for such information access.

New GUIs should therefore help people find information that they want, or that they might want. Unfortunately, the very vastness of available data can overwhelm a user; desired data can become difficult to find and search heuristics employed to locate desired data often return unwanted data (also referred to as "noise").

Various concepts have been employed to help users locate desired data. In the context of the Internet for example, some services have organized content based on a hierarchy of categories. A user may then navigate through a series of hierarchical menus to find content that may be of interest to them. An example of such a service is the YAHOO™ World Wide Web site on the Internet. Unfortunately, content, in the form of Internet "web sites" for example, must be organized by the service and users must navigate through a predetermined hierarchy of menus. If a user mistakenly believes that a category will be of interest or include what they were looking for, but the category turns out to be irrelevant, the user must backtrack through one or more hierarchical levels of categories.

Again in the context of the Internet for example, some services provide "search engines" which search databased content or "web sites" pursuant to a user query. In response to a user's query, a rank ordered list, which includes brief descriptions of the uncovered content, as well as a hypertext links (text, having associated Internet address information, which, when activated, commands a computer to retrieve content from the associated Internet address) to the uncovered content is returned. The rank ordering of the list is typically based on a match between words appearing in the query and words appearing in the content. Unfortunately, however, present limitations of search heuristics often cause irrelevant content (or "noise") to be returned in response to a query. Again, unfortunately, the very wealth of available content impairs the efficacy of these search engines since it is difficult to separate irrelevant content from relevant content.

The foregoing means permit users to find content of interest to them, or to deliver content that may be of interest to a user. Unfortunately, neither of the foregoing means is particularly well suited when the user wants to "go back" to (or "relocate") information (or content), to revisit that information or to revisit a familiar content provider to view new information (or content). More specifically, a person typically does not want to go through steps of navigating through a hierarchy of menus, or entering a search query to get to favored content or favored content providers.

§ 1.2.2.1 INFORMATION ACCESS USER INTERFACES AND THEIR LIMITATIONS

In view of the shift towards using computers to access information, a number of user interfaces have been developed to help people revisit or relocate information or content providers. A sample of these user interfaces, as well as perceived limitations of such user interfaces, is presented below.

§ 1.2.2.1.1 BOOKMARKS AND FAVORITES LISTS

Some so-called "Internet browser" program services, such as Microsoft's Internet Explorer™ for example, permit people to create lists of favorite Internet locations (as located by a Uniform Resource Locator or "URL") represented by bookmarks. Unfortunately, as the number of bookmarks in a list increases, a person's ability to find a desired bookmark becomes more difficult. Although people can arrange and organize such lists of bookmarks into hierarchies, this requires some effort (mental effort is also referred to as "cognitive load") to organize and maintain the hierarchy. Moreover, the use of hierarchies does not fully exploit the spatial memory (This concept has also been referred to as "where it is is what it is".) of people.

§ 1.2.2.1.2 WEB BOOK/WEB FORAGER

The article, Card, et al., "The WebBook and Web Forager: An Information Workspace for the World-Wide Web," *Proceedings of CHI '96*, pp. 111–117 (Apr. 13–18, 1996) (hereafter referred to as "the WebBook article") also recognized the trend towards the use of computers for information access. Focusing on the use of the Internet, the WebBook article noted, among other things, that web pages are often hard to find, users get lost and have difficulty relocating pages, and users have difficulty organizing found pages. The article then discussed a WebBook™ which simulates, in three dimensions, a physical book and includes pages, each of which correspond to a web page. Hypertext links are color coded to indicate whether the referenced web page is within the currently opened book or not. If the web page referenced by the link is in the book, activating the hypertext link will effect an animation of flipping pages to the desired web page. If the web page referenced by the link is not in the book, activating the hypertext link will close the currently opened WebBook and, if the web page is in another WebBook on a simulated bookshelf, will open that WebBook to the selected web page. The user can flip or ruffle through the pages of the WebBook using various input techniques. Portions of interest on a web page may be inspected with panning and zooming operations. The Document Lens feature described in the WebBook article is related to U.S. Pat. No. 5,670,984 to Robertson (incorporated herein by reference).

Although the WebBook uses screen space efficiently and uses a familiar metaphor, it has a number of limitations. First, the book metaphor limits the number of web pages that can be seen at one time—most pages are totally occluded. Second, the book metaphor does not exploit spatial memory. That is, it is believed that user will only remember the ordered pages in a linear (or one-dimensional) manner.

The WebBook article also discusses a Web Forager which embeds the WebBook and other objects in a hierarchical three-dimensional workspace. The workspace includes four (4) hierarchical levels; namely a focus place, an immediate memory space, a secondary storage area, and a tertiary storage area. In the focus place, objects are rendered in full size and can be acted upon by the user. The immediate memory space uses the metaphor of a desk top. The secondary storage area uses several tiers in Z space, in which objects can be moved. Finally the tertiary storage area uses a bookshelf metaphor. A book selected from the bookshelf will come up to the focus place and an object then in the focus place will be moved into the intermediate memory space.

Although the Web Forager exploits, at least to some extent, spatial memory, particularly in the secondary storage area, the interaction between the focus place, immediate memory place, secondary storage area, and tertiary storage area may not be immediately obvious to new users. Further, if more than about 30 objects are placed in the secondary storage place, objects may become occluded. Finally, the use of tiers in the Z dimension of the secondary storage place limits the exploitation of a user's spatial memory.

§ 1.2.2.1.3 WORKSCAPE

Noting the concept of "what it is is where it is", the article, Ballay, "Designing Workscape™: An Interdisciplinary Experience", *Human Factors in Computing Systems, CHI '94*, pp. 10–15 (April 1994) (hereafter referred to as "the Workscape article"), discusses a three-dimensional user interface for managing documents. As discussed at the web page on the Internet at *http://www.maya.com/Portfolio/workscape.html* (downloaded Jul. 7, 1998, revised 1998), Workscape permits users to drag documents in the X-Y plane, and also push and pull documents in the Z dimension.

Although Workscape exploits spatial memory, it is apparently not concerned with the problem of object occlusion. Furthermore, it is believed that separate user operations for (i) dragging an object in the X-Y plane, and (ii) pushing and pulling documents in the Z dimension, will be cumbersome for users in practice.

§ 1.2.2.1.4 MAPA

The product MAPA, offered by Dynamic Diagrams of Providence, R.I., uses a three-dimensional display to show the organization of web pages at a web site. As a web page is selected, its children in the web site hierarchy are displayed. The pages are represented by sheets. As a user's cursor hovers over a page, a pop-up title is provided. Although MAPA may be useful for visualizing large amounts of hierarchical data, it lends itself to a predetermined hierarchies (i.e., web pages of a web site). That is, it is believed that the strength of MAPA is presenting information, not building or updating hierarchies of information.

§ 1.2.2.1.5 MacIntosh and Windows NT® Operating Systems

Some versions of the MacIntosh and Windows NT® Operating Systems permit users to arrange, using a mouse drag operation for example, icons on a two-dimensional surface rendered on the screen of a video monitor. Drag feedback is provided. The user's arrangement of the icons persists. However, the icons represent applications or files or directories—they are not miniature images, or thumbnails, of objects.

§ 1.2.2.1.6 Windows NT® 5.0

A file manager or windows explorer feature of Windows NT® 5.0 may be configured to display document or file thumbnails in a selected directory. Each thumbnail includes a title which persists (i.e., is continuously rendered). A user can rearrange these thumbnails on a display screen, for example, by using a mouse drag operation. However, no drag feedback is provided. Furthermore, the user arrangement of the thumbnails does not persist. That is, when the selected directory is left and then reentered, the thumbnails are arranged in a default manner, not based on a previously entered user arrangement.

§ 1.2.2.1.7 InfoGrid

The article: R. Rao, S. K. Card, H. D. Jellinek, J. D. Mackinlay, and G. G. Robertson, "The Information Grid: A Framework for Information Retrieval and Retrieval-Centered Applications," *UIST'92*, pp. 23–32 (Nov. 15–18, 1992) (hereafter referred to as "the InfoGrid article") discusses a user interface for object (e.g., document) retrieval. The InfoGrid display layout includes (i) an area for entering search parameters, (ii) a control panel which includes tool buttons, (iii) a area for rendering thumbnails of objects returned from a search, (iv) an area to hold selected objects, (v) an area for depicting a search path, and (vi) an area for depicting a document and its properties. The InfoGrid does not exploit a user's spatial memory and, in fact, teaches away from using location-centric workspace retrieval. (See page 31 of the InfoGrid article.) Instead, the InfoGrid permits a user to specify an initial query by providing values for various fields in a search parameter area, after which objects may be retrieved using an iterative process. (See page 26 of the InfoGrid article.)

§ 1.2.3 UNMET NEEDS

As discussed above, there exists a need for a user interface, and in particular a graphical user interface, to information or content. Such a user interface should exploit spatial memory. For example, the user interface should permit continuous movement in the simulated space. The user interface should also be intuitive to minimize the time needed for a user to become familiar with it. For example, the user interface should not be cumbersome or require too many different types of inputs to manipulate objects. Finally, the user interface should provide intelligent help to the user.

§ 2. SUMMARY OF THE INVENTION

The present invention provides a user interface, and in particular a graphical user interface, to organize and access information or content (also referred to as an "object"). The present invention permits a user to view and organize all objects and to edit or otherwise work on a selected object by, for example, representing, graphically, objects or content with a low resolution scaled image which can be added, moved, or deleted from a two-dimensional wall or screen on the user's video monitor. The spatial location, as well as the scaled image, allow user to navigate to desired content with minimal cognitive load and adequate certainty. The present invention may use pop-up title or information bars for permitting a user to discern more about the object represented by a low resolution image. Thus, the pop-up title or information bars permit a user to locate desired content with increased certainty, or to confirm that they have located desired content, with just a bit more cognitive load. The present invention may use higher resolution image representations of objects, or "live" objects loaded within an associated application, for editing or otherwise working on a selected object. Other visual representations of objects may be used, such as schematic or iconic representations of the content of each object for example. Any and all visual representations of objects may be referred to as "thumbnails" in the following. The two-dimensional wall or screen may include visual landmarks for enhancing a user's spatial memory. When an object thumbnail is being moved, or when an object thumbnail that had been moved is released, the present invention may employ image occlusion avoidance so that no object thumbnail is totally occluded by another.

The user interface of the present invention is intuitive and minimizes the time needed for a user to become familiar with it. The user interface of the present invention is neither cumbersome, nor does it require too many different types of inputs to manipulate the object "thumbnails". For example, the present invention may use inputs from a familiar input device such as a mouse or pointer to manipulate the object thumbnails.

Finally, the user interface of the present invention can provide intelligent help to the user. For example, the present invention may cluster, by rendering a visual boundary for example, object thumbnails which are arranged, by the user, relatively close to one another. Further, the present invention may employ a matching (e.g., correlation or similarity) algorithm to determine whether certain objects are related. Alternatively, objects may be related by an explicit selection or designation by a user. If so, the present invention may employ some type of visual indication, such as a colored halo around thumbnails of related objects for example, of related objects. This visual indication may be rendered continuously or, alternatively, upon an event, such as when an object thumbnail is made "active".

§ 3. BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIGS. 12A through 12W are various displays which depict various alternative ways of rendering implicit query information.

FIGS. 13A through 13C are various displays which depict a way of representing local clusters of objects.

FIGS. 14 is a display which depicts the selection of multiple items.

Figure 15B:
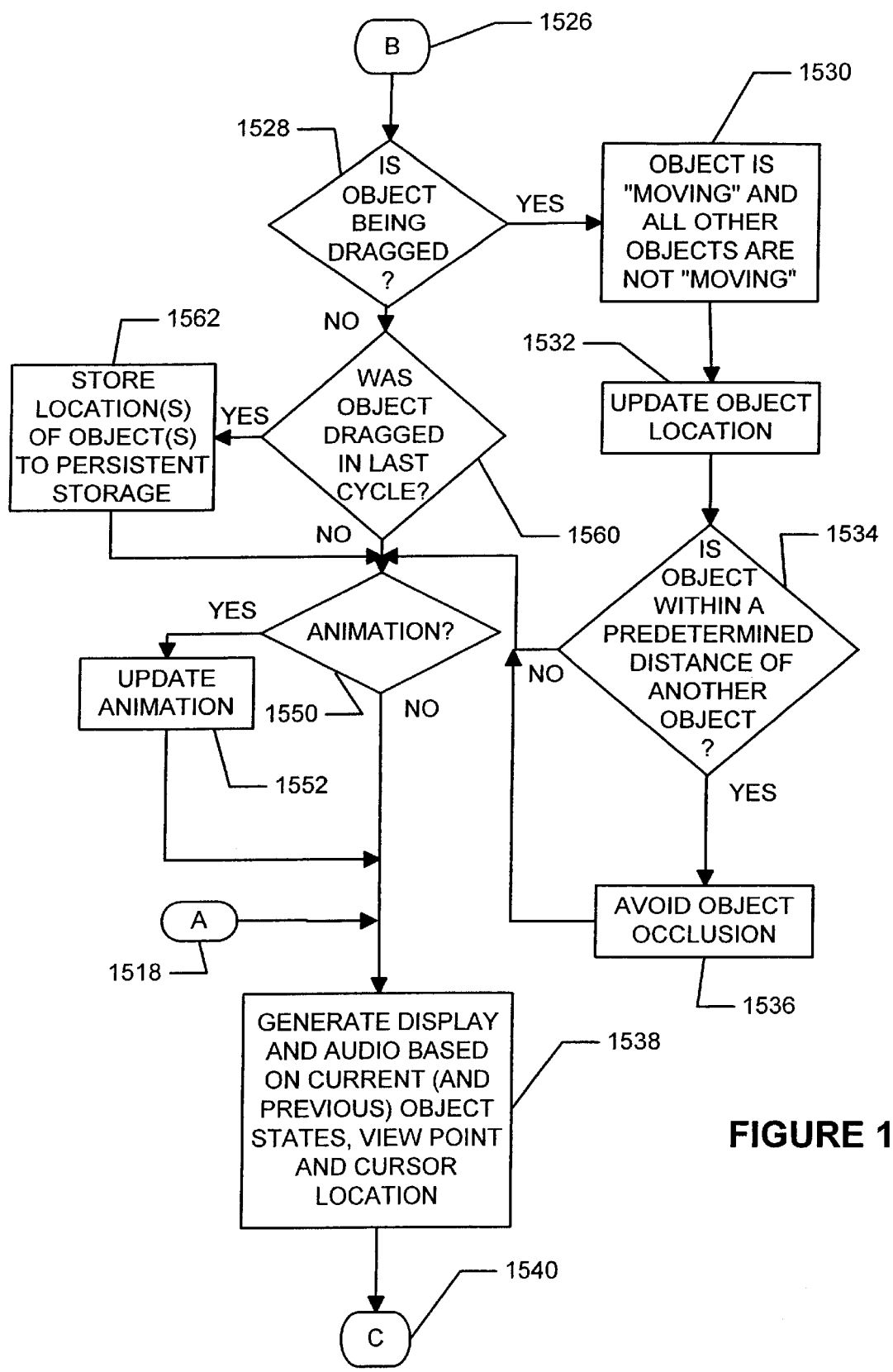

FIG. 15, which includes FIGS. 15A and 15B, is a flow diagram of an animation loop process which may be used by the user interface of the present invention.

Figure 16A:
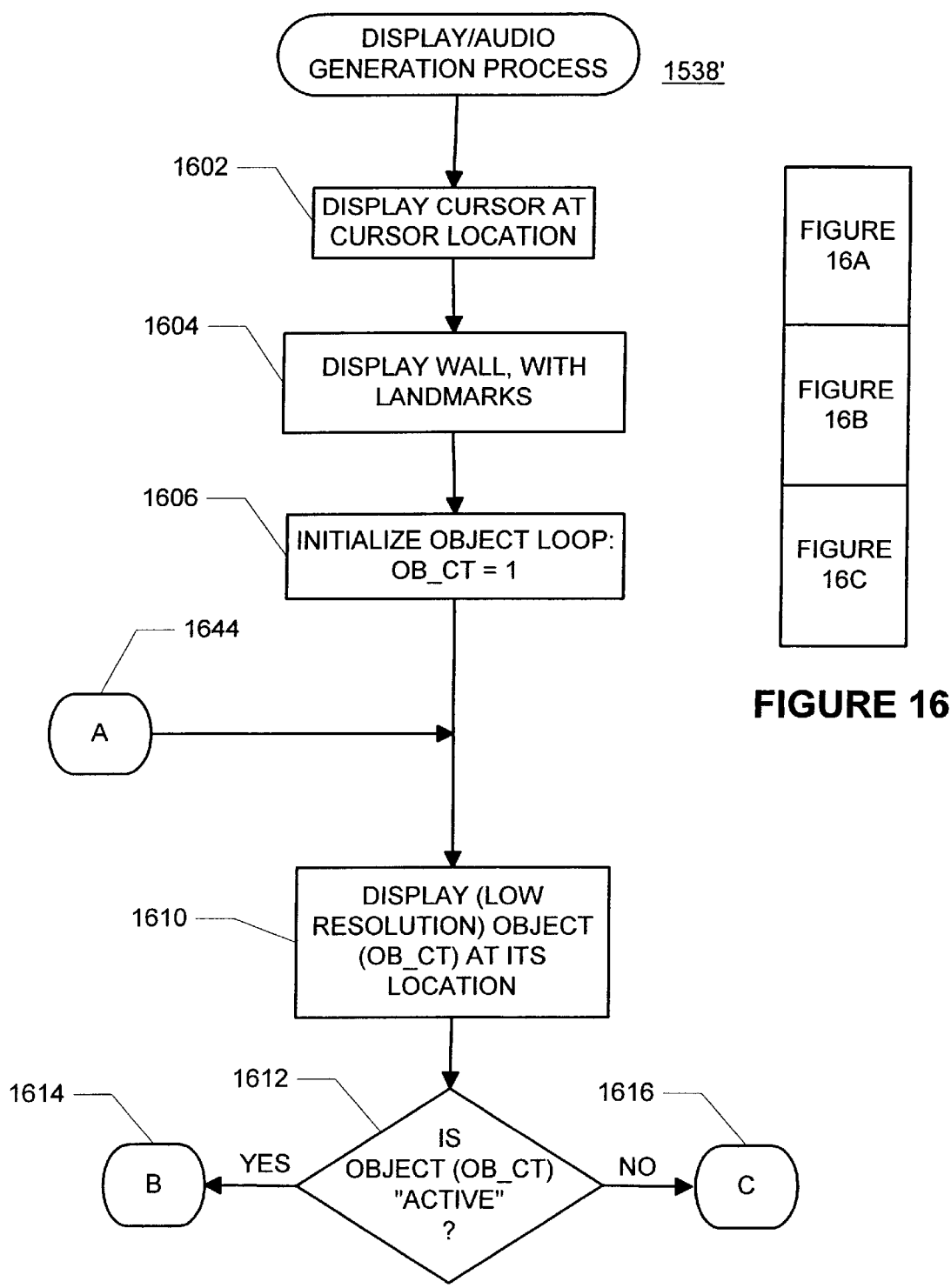
Figure 16B:
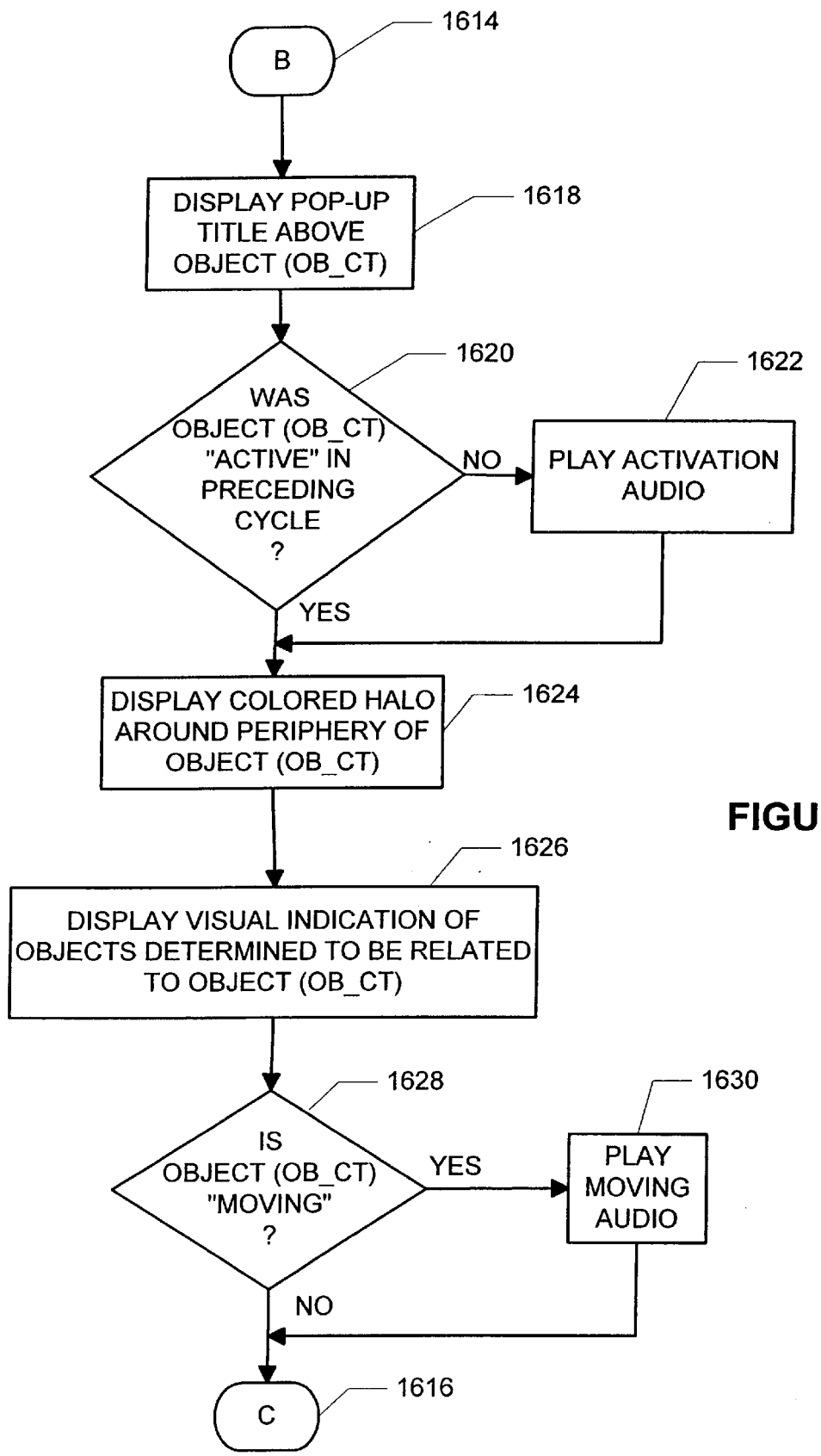
Figure 16C:
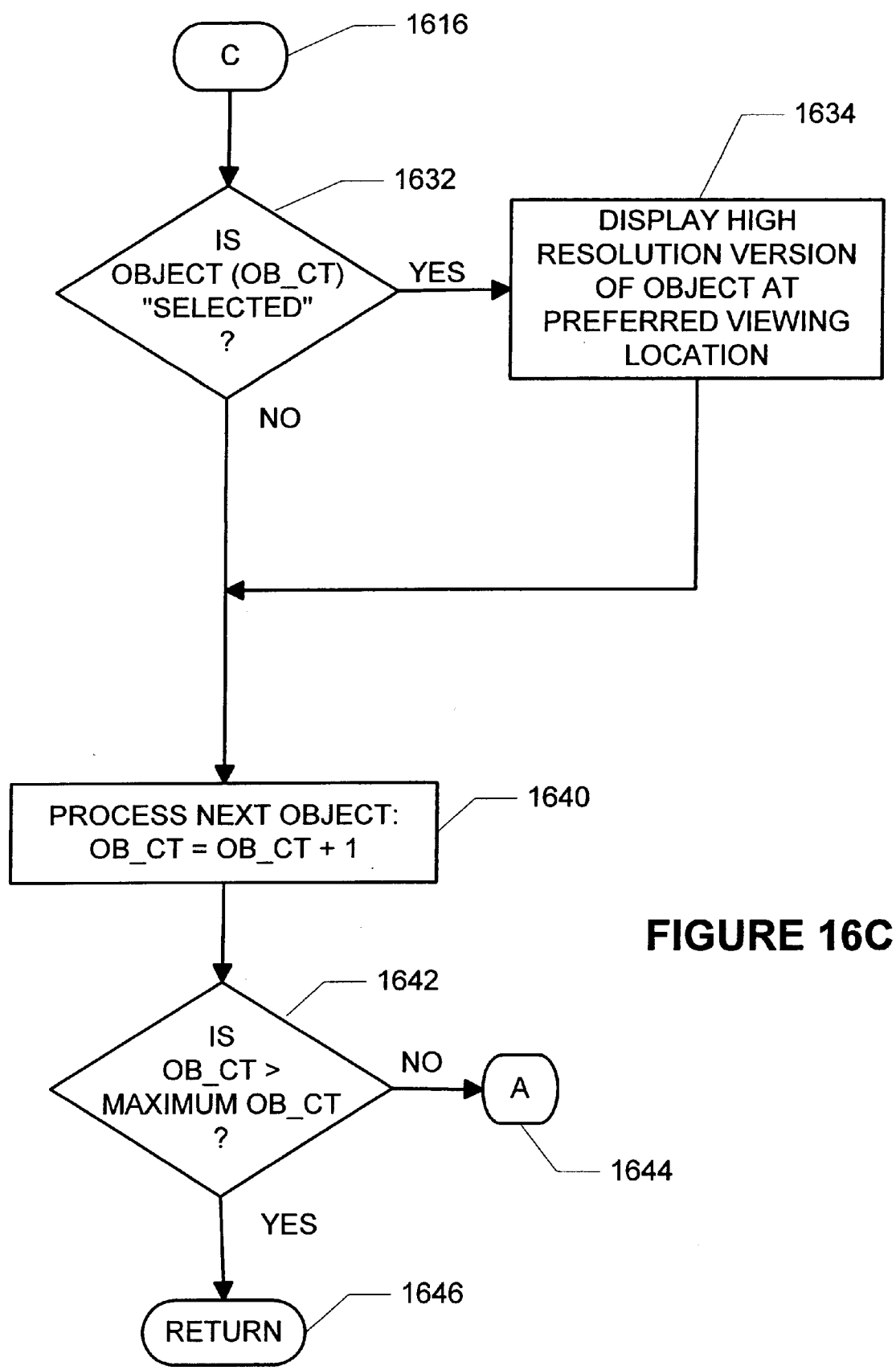

FIG. 16, which includes FIGS. 16A, 16B, and 16C, is a display and audio generation and rendering process which may be used by the animation loop process of FIG. 15.

Figure 17:
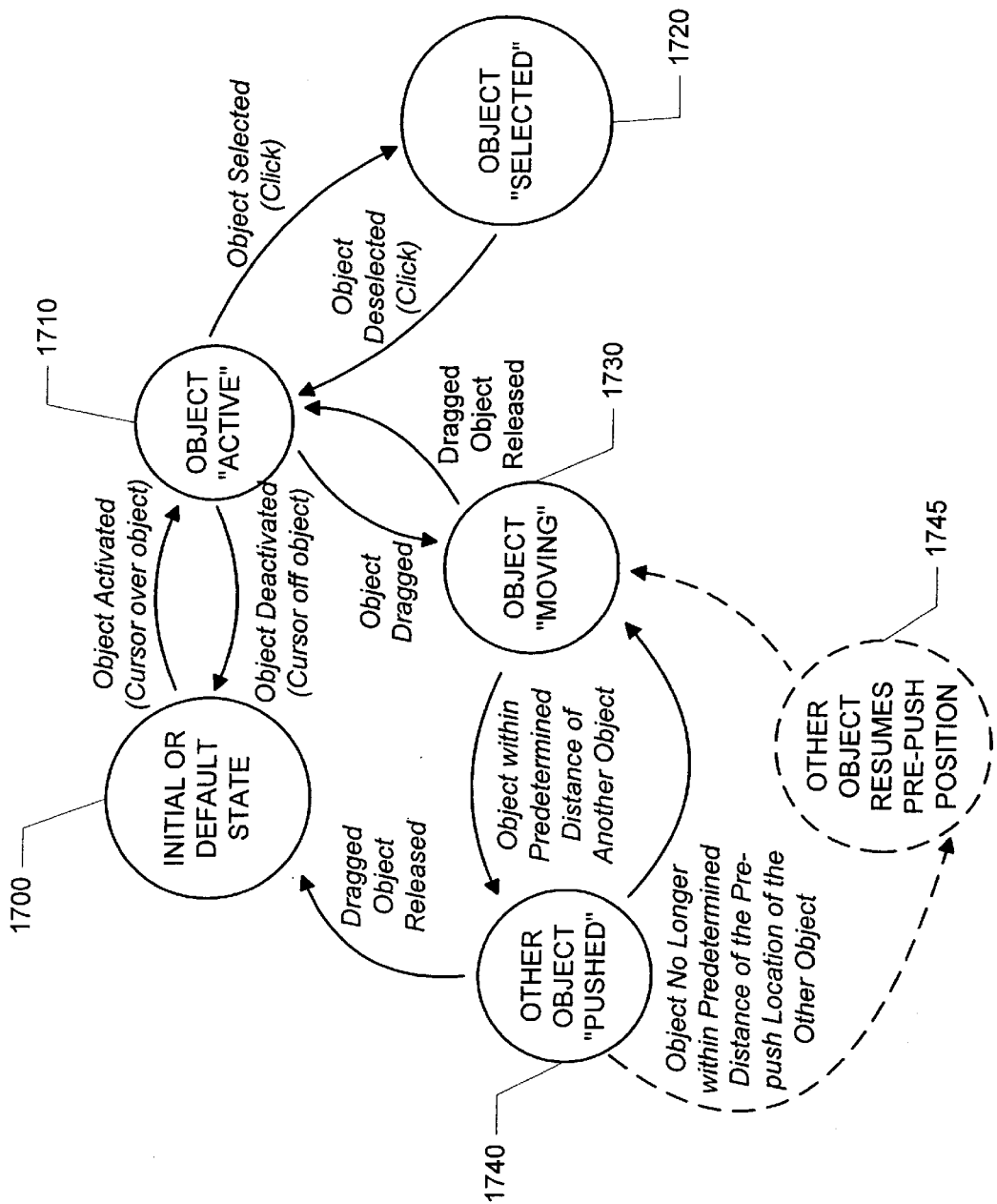

FIG. 17 is a diagram of states and state transitions which the user interface of the present invention may use.

FIGS. 18A and 18B are flow diagrams of alternative object occlusion avoidance methods.

§ 4. DETAILED DESCRIPTION

The present invention concerns novel methods, apparatus and data structures for providing a user interface. The following description is presented to enable one skilled in the art to make and use the invention, and is provided in the context of particular applications and their requirements. Various modifications to the disclosed embodiment will be apparent to those skilled in the art, and the general principles set forth below may be applied to other embodiments and applications. Thus, the present invention is not intended to be limited to the embodiments shown.

Features of, and functions which may be performed by, the present invention, will first be described in § 4.1 below.

Then, structures, methodologies, data structures and displays of exemplary embodiments of the present invention will be described in § 4.2 below.

§ 4.1 FUNCTIONS WHICH MAY BE PERFORMED BY THE PRESENT INVENTION

Recall from § 1.2.3 above, that there exists a need for a user interface, and in particular a graphical user interface, to information or content (also referred to as an "object"). A user should be able to view and organize all objects and to edit or otherwise work on a selected object. To achieve these goals, the present invention may represent, visually, objects (e.g., a document, a spread sheet, a business contact, a drawing, a picture or image, a web page, a resource location or directory, etc., or a representation thereof) or content with a low resolution scaled image (e.g., a 64 pixel by 64 pixel bit map having 24 bit color) which can be added, moved, or deleted from a display rendered on a video monitor. The present invention may use pop-up title bars (or other descriptive textual information) for permitting a user to discern more about the object represented by a low resolution image. The present invention may use higher resolution image (e.g., a 512 pixel by 512 pixel bit map having 24 bit color) representations of objects, or "live" objects loaded within an associated application, for editing or otherwise working on a selected object. Other visual representations of objects may be used. Any and all visual representations of objects may be referred to as "thumbnails" in the following.

Recall also from § 1.2.3 above, that a user interface should exploit spatial memory. To achieve this goal, the present invention may render a two-dimensional wall on which the object thumbnails may be manipulated. The wall or screen may include visual (or audio) landmarks for enhancing a user's spatial memory.

Recall further from § 1.2.3 above that a user interface should also be intuitive to minimize the time needed for a user to become familiar with it. For example, the user interface should not be cumbersome, nor should it require too many different types of inputs to manipulate the object thumbnails. To achieve this goal, the present invention may use inputs from a familiar input device such as a mouse or pointer to manipulate the object thumbnails. The present invention may also prevent any one object thumbnail (or landscape feature) from totally occluding another object thumbnail so that neither is (totally) hidden from the user.

Recall finally from § 1.2.3 above, that the user interface should provide intelligent help to the user. The present invention may cluster, by rendering a visual boundary for example, object thumbnails which are arranged, by the user, relatively close to one another. Further, the present invention may employ a matching (e.g., correlation or similarity) algorithm to determine whether certain objects are related. Alternatively, objects may be related by an explicit selection or designation by a user. If so, the present invention may employ some type of visual indication, such as a colored halo around thumbnails of related objects for example, of related objects. This visual indication may be rendered continuously or, alternatively, upon an event, such as when an object thumbnail is made "active".

Having described functions which may be performed by the present invention, structures, methodologies, data structures and displays which may be used by the present invention are now described in § 4.2.

§ 4.2 STRUCTURES, METHODOLOGIES, DATA STRUCTURES, AND DISPLAYS WHICH MAY BE USED BY THE PRESENT INVENTION

In the following, exemplary systems on which the present invention may operate are described in § 4.2.1, exemplary displays which may be generated by the present invention are described in § 4.2.2, exemplary processes and data structures which may be used to effect certain aspects of the present invention are described in § 4.2.3, and flow diagrams showing an operation of an exemplary methodology of the present invention are described in § 4.2.4.

§ 4.2.1 EXEMPLARY SYSTEMS

FIG. 1A and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 1A, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows NT® 4.0, sold by Microsoft Corporation of Redmond, Wash.), one or more application programs 136, other program modules 137 (such as ReActor infrastructure and Microsoft Interactive Sound System, for example, both from Microsoft Corporation of Redmond, Wash.), and/or program data 138 for example. A user may enter commands and information into the personal computer 120 through input devices, such as a keyboard 140 and pointing device 142 for example. Other input devices (not shown) such as a microphone, joystick, game pad, satellite dish, scanner, or the like may also be included. These and other input devices are often connected to the processing unit 121 through a serial port interface 146 coupled to the system bus. However, input devices may be connected by other interfaces, such as a parallel port, a game port or a universal serial bus (USB). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative Labs of Milpitas, Calif.). In addition to the monitor 147 and speaker(s) 162, the personal computer 120 may include other peripheral output devices (not shown), such as a printer for example.

The personal computer 120 may operate in a networked environment which defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1A. The logical connections depicted in FIG. 1A include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152. The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

FIG. 1B is a more general machine 100' which may effect one or more of the processes discussed above. The machine 100' basically includes a processor(s) 102, an input/output interface unit(s) 104, a storage device(s) 106, and a system bus or network 108 for facilitating data and control communications among the coupled elements. The processor(s) 102 may execute machine-executable instructions to effect one or more aspects of the present invention. At least a portion of the machine executable instructions and data structures may be stored (temporarily or more permanently) on the storage devices 106 and/or may be received from an external source via an input interface unit 104.

§ 4.2.2 EXEMPLARY DISPLAYS

Figure 9:
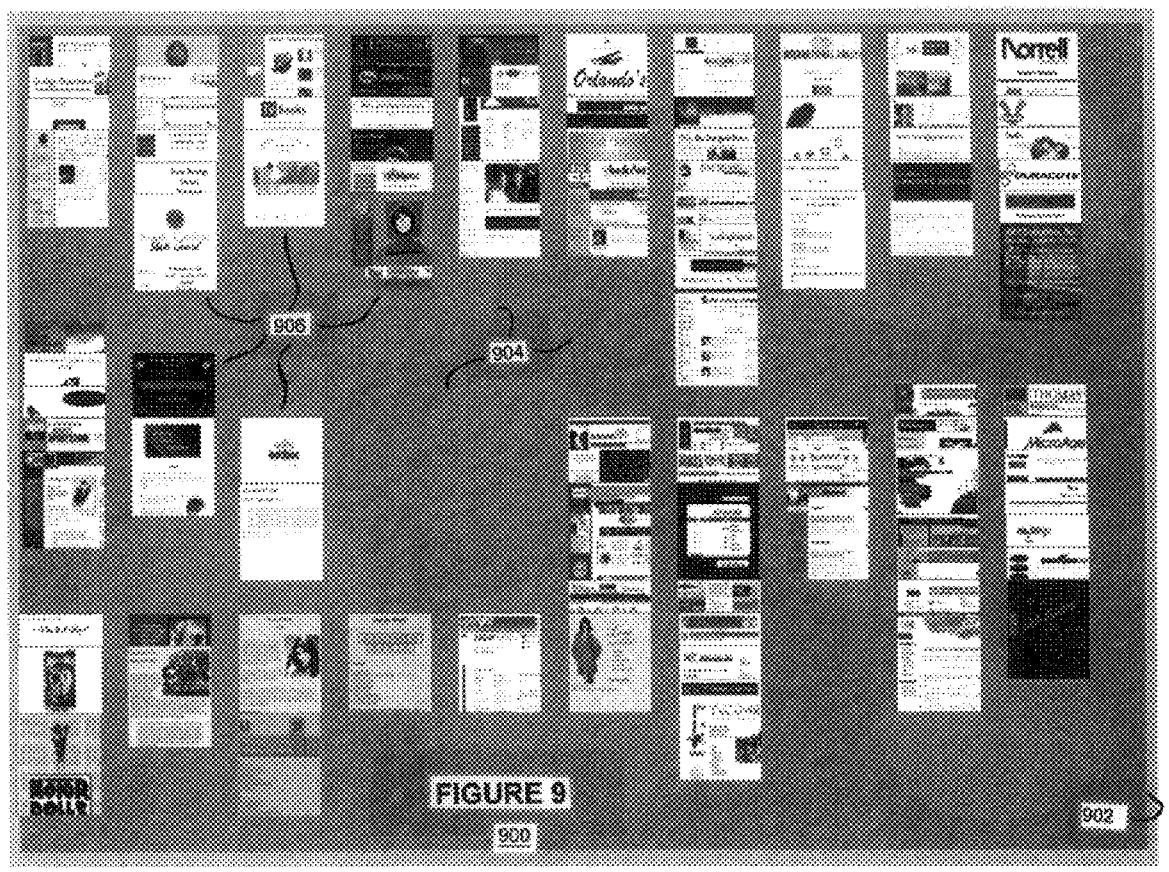
FIG. 9 is an exemplary display of web page thumbnails using the user interface of the present invention.

As discussed in § 4.1 above, present invention may represent, visually, objects using object thumbnails which may be manipulated on a two-dimensional wall or screen. FIG. 9 is a display 900 which illustrates a wall or screen 902 having low resolution images (e.g., 64 pixel by 64 pixel bitmaps having 24 bit color) or object thumbnails 906. In the display 900, the object thumbnails 906 represent web (or hypertext markup language or "HTML") pages. As discussed in § 4.1 above, the wall 902 may include visual landmarks for enhancing a user's spatial memory. For example, colored circles 904 may be provided on the wall 902.

Figure 11:
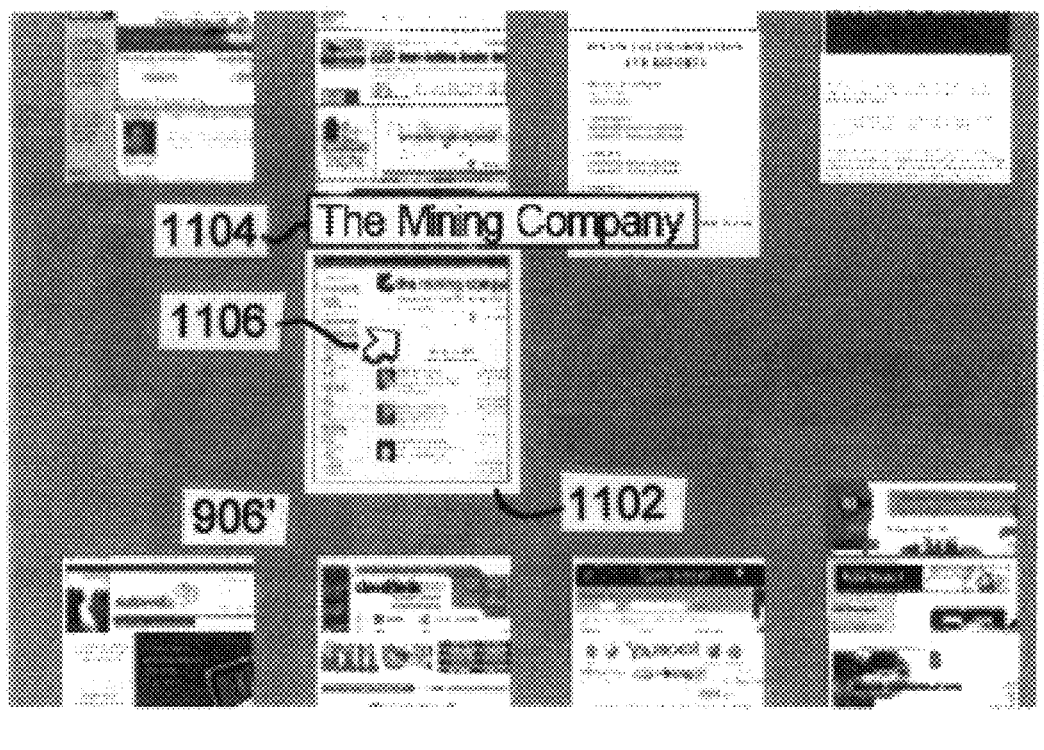
FIG. 11 is an exemplary display showing a pop-up title on a web page thumbnail using the user interface of the present invention.

As also discussed in § 4.1 above, the present invention may use pop-up title bars for permitting a user to discern more about the object represented by the object thumbnail 906. Referring to FIG. 11, which depicts a screen portion 1100, when a cursor 1106, under control of a user, is on (or passes over, or hovers over) an object thumbnail 906', that object thumbnail may be considered "active". A colored halo 1102 may be provided around the active object thumbnail 906'. Further, a pop-up title bar 1104 may be provided over the active object thumbnail 906'. The pop-up title bar 1104 provides the user with more information about the underlying object, in this example, indicating that the underlying object is the web page of "The Mining Company". By providing pop-up title bars 1004, a user can navigate to desired content with minimal cognitive load and adequate certainty based on the object images and their locations, and then rifle through objects in a given area by quickly looking at their pop-up title bars. Thus, the pop-up title or information bars permit the user to locate the desired content with increased certainty, or to confirm that they have located the desired content, with just a bit more cognitive load.

Figure 10:
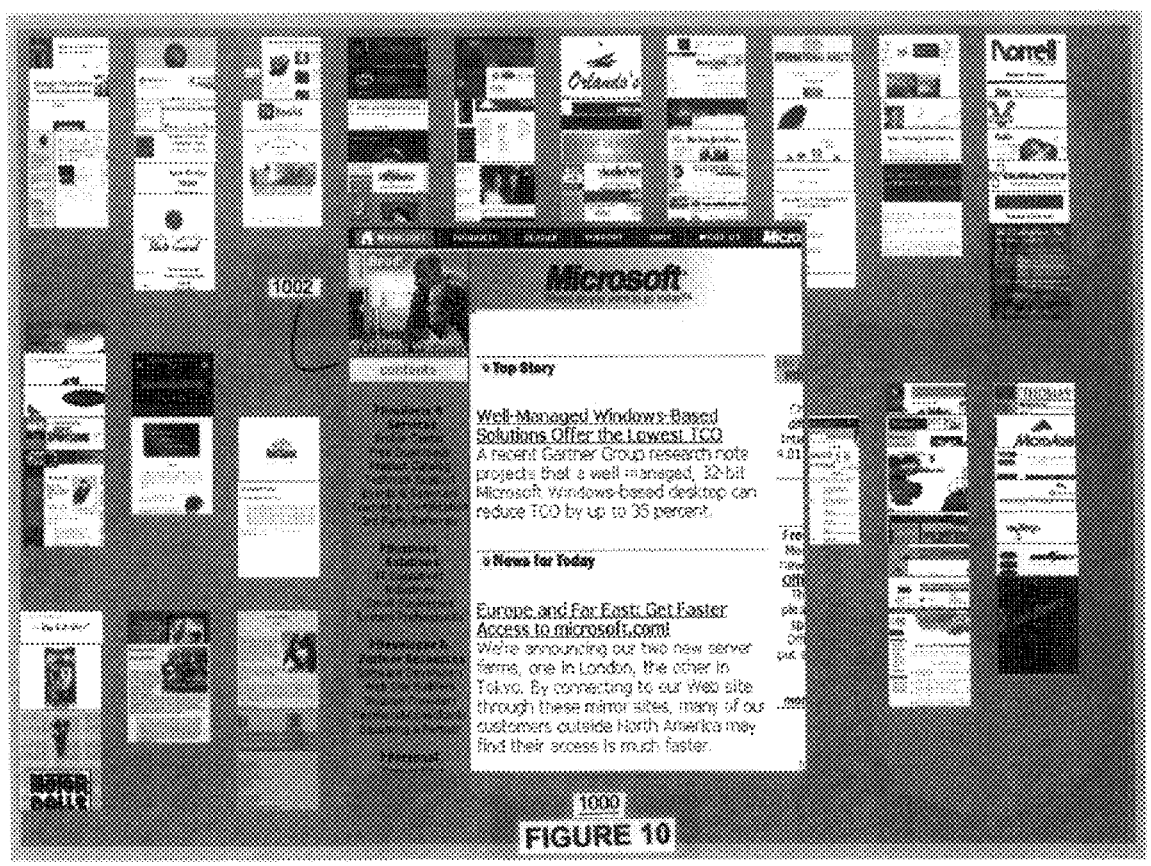
FIG. 10 is an exemplary display showing a selected web page using the user interface of the present invention.

Finally, recall from § 4.1 above that the present invention may use higher resolution image representations of objects, or "live" objects within an associated application, for editing or otherwise working on a selected object. Referring to FIG. 10, a display 1000 showing a "selected" object thumbnail 1002 is shown. The selected object thumbnail 1002 is displayed in a preferred viewing position, in this case, at the lower center of the two-dimensional wall or screen. In this case, the selected object thumbnail 1002 is a high resolution bit map (e.g., 512 pixels by 512 pixels with 24 bit color). To reiterate, rather than merely providing a high resolution object thumbnail, the actual object, in its associated application, may be presented. In this example, the Internet Explorer™ Internet browser (part of Microsoft Windows NT® 4.0 operating system sold by Microsoft Corporation of Redmond, Washington) may be rendering a web page, with the user interface of the present invention in the background. The application can be maximized, as is known to those skilled in the art, to substantially fill the screen of the video monitor. Further, the images may be rendered as an off-screen bitmap, which can be placed in the preferred viewing position when an object is selected. If the objects are HTML web pages, this may be done, for example, using techniques discussed in the article, M. Heydt, "Incorporating the Web Browser Control Into Your Program", *Microsoft Interactive Developer*, Vol. 3, No. 7, pp. 42–51 (July 1998).

In consideration of interface consistency to the user, when an object thumbnail is "selected", an animation, taking on the order of one second, may be used to move the object thumbnail from its position to a preferred viewing location and use the larger high resolution thumbnail or the application with the "live"object, so that the user perceives the object as moving towards them.

§ 4.2.3 EXEMPLARY PROCESSES AND DATA STRUCTURES

Figure 2:
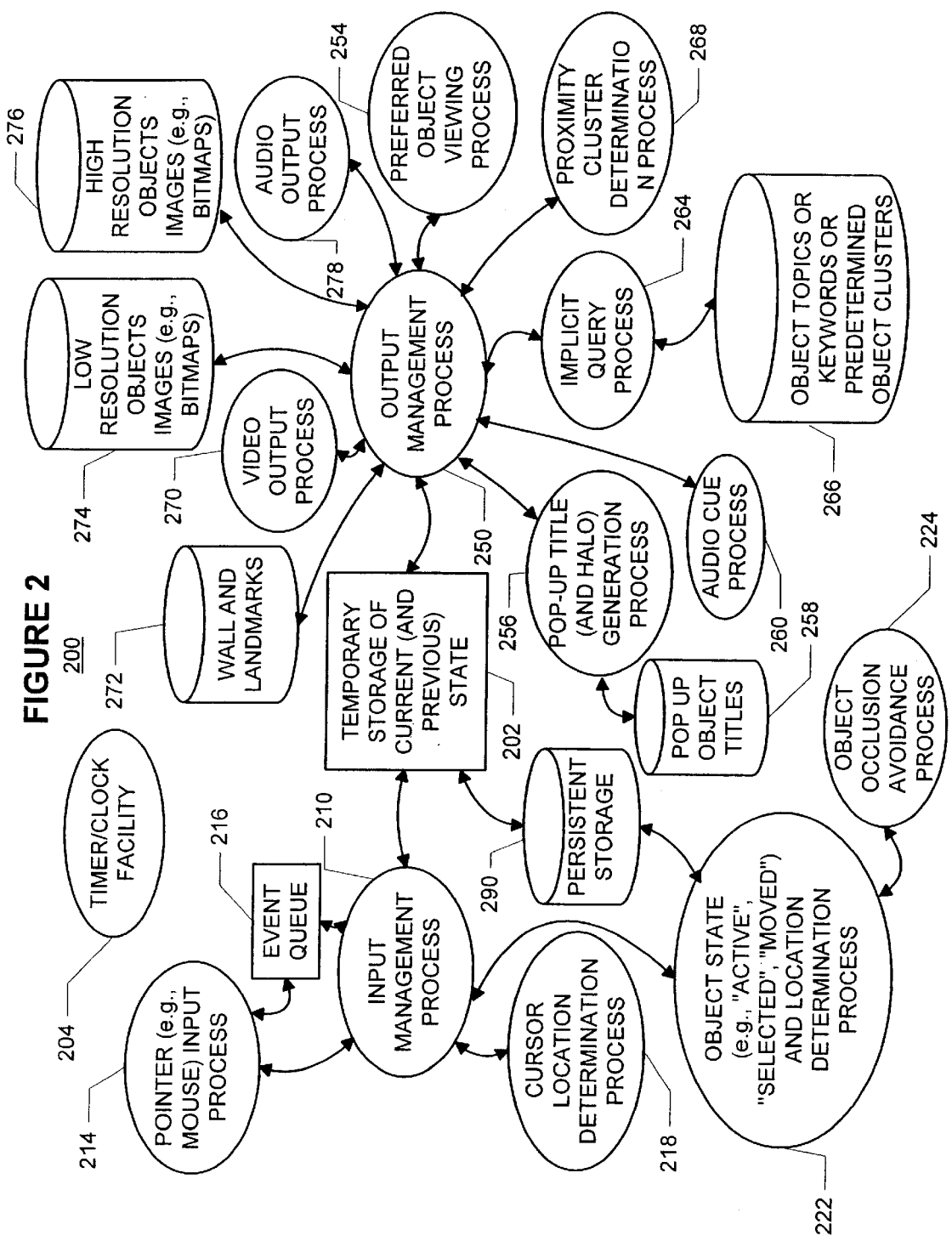
FIG. 2 is a diagram of processes and stored data which may be used to effect the user interface of the present invention.

FIG. 2 is a diagram of processes and stored data which may be used to effect, at least certain aspects, of the user interface of the present invention. Basically, the processing by the present invention may be thought of as a sequence of cycles. In each cycle, user inputs are accepted, states are updated, if necessary, based on such user inputs, and a display is rendered (and audio is output) based on the updated states. Referring to FIG. 2, user inputs are managed by an input management process (or more generally, an "input manager") 210. Information of a current state is stored at temporary storage means 202. To the extent that state changes or transitions need to be accounted for, the temporary storage means 202 may also store one (or more) preceding state. Alternatively, state change or state transition flags may be stored in the temporary storage means 202. Outputs are managed by the output management process (or more generally, an "output manager") 250.

Below, first the state information, which may be stored in the temporary storage device 202, is described. Then, processes related to the input management process 210 are described. Finally, processes related to the output management process 250 are described.

Figure 3:
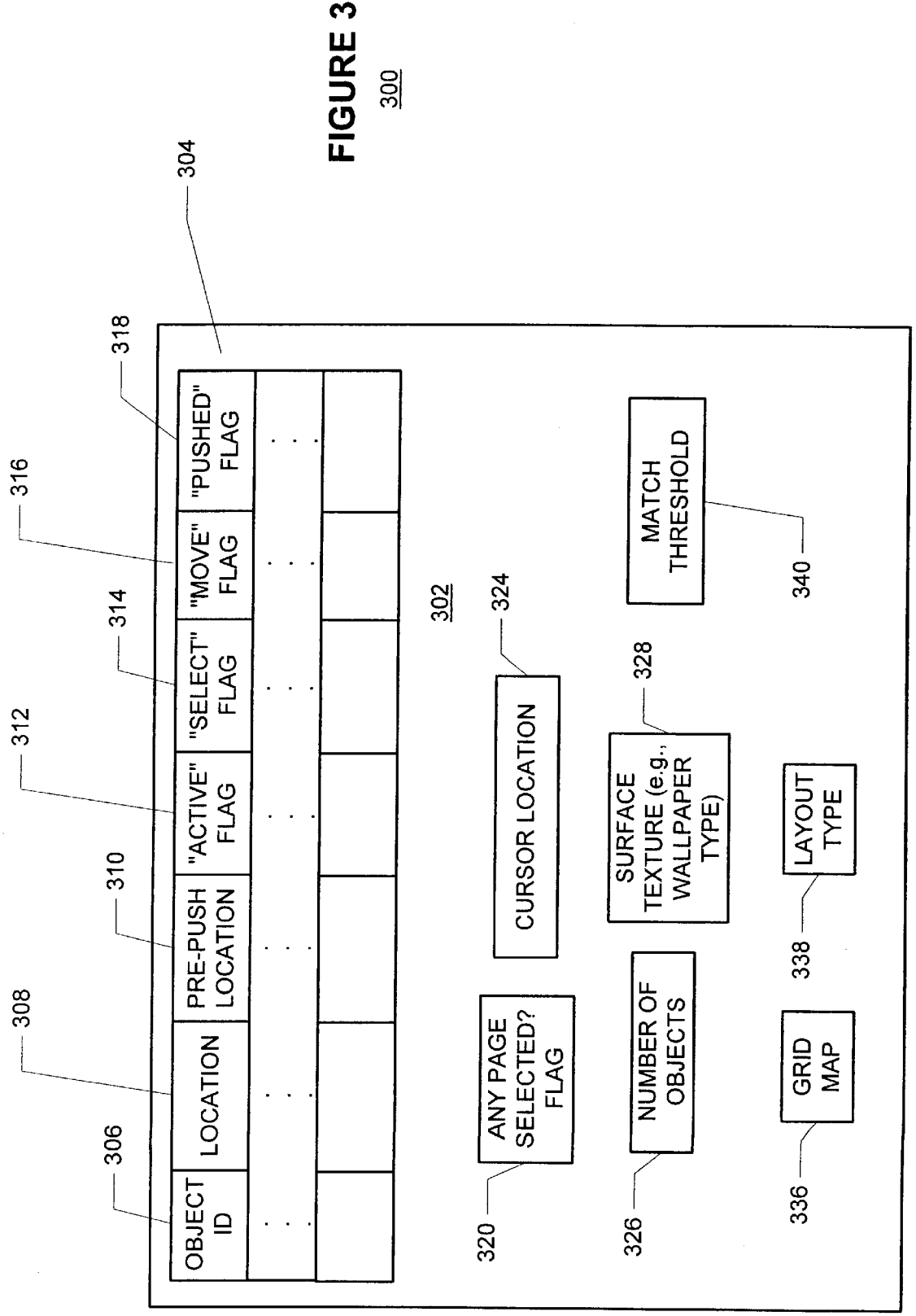
FIG. 3 is an exemplary data structure of state data which may be temporarily stored and used when effecting the user interface of the present invention.
Figure 4:
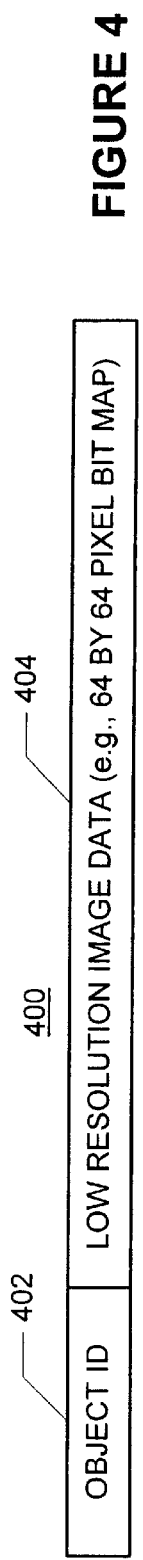
FIG. 4 is an exemplary data structure of a record of low resolution image data of an object which may be used when effecting the user interface of the present invention.
Figure 5:
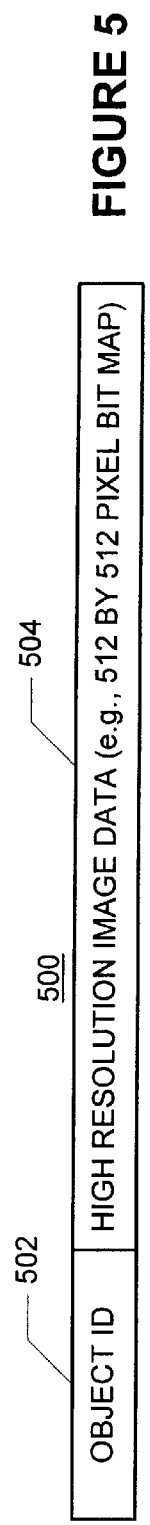
FIG. 5 is an exemplary data structure of a record of high resolution image data of an object which may be used when effecting the user interface of the present invention.
Figure 6:
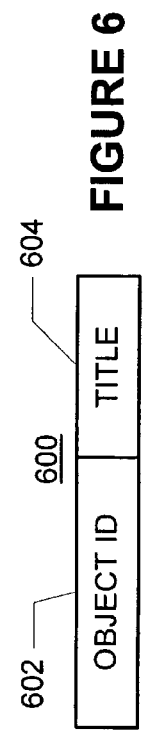
FIG. 6 is an exemplary data structure of a record of title (or other) data which may be used when effecting the user interface of the present invention.
Figure 7:
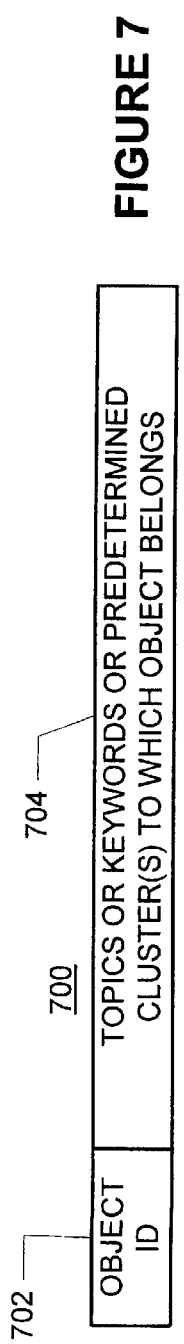
FIG. 7 is an exemplary data structure of a record of implicit query information which may be used when effecting the user interface of the present invention.

FIG. 3 is an exemplary data structure 300 of state information which may be used by the user interface of the present invention. Object information 302 may include a record 304 corresponding to each object. As shown in FIG. 3, an object record 304 may include an object identifier field 306 which includes a value used to distinguish the object from all other objects. For example, if the object is an HTML page on the Internet, the object identifier may be a URL (or "Uniform Resource Locator"). Accordingly, each object should have a unique object identifier value in field 306. The object record 304 may also include a location field 308 which contains information about the location of the object (or object thumbnail). The location information in field 308 may include a two-dimensional screen location or coordinates which may be mapped to a screen location. In one embodiment, a grid (not displayed to the user) may be used to overlay the monitor screen or the two-dimensional wall . In this case, each object will be anchored to a particular grid coordinate which will be stored in that object's location field 308. If an object thumbnail is "pushed", as will be discussed in detail below to avoid full object occlusion, in one embodiment, its pre-push location also may be stored in field 310 for reasons which will become apparent below. Each object record 304 may also include a field 312 containing a flag indicating whether or not the object is "active" (as described below), a field 314 containing a flag indicating whether or not the object is "selected" (as described below), a field 316 containing a flag indicating whether or not the object is "moving" (as described below), and a field 318 containing a flag indicating whether or not the object is being "pushed" (as described below). If any of the objects are selected, the "any page selected?" flag is set in field 320.

In addition to the object information 302, the state information 300 also includes a cursor location field 324 for storing a two-dimensional location of a cursor. The number of objects may be stored in field 326.

Other parameters are used when rendering the display. These parameters are either fixed or may have default values which may be changed by the user. For example, a texture of the wall or display screen (e.g., a "wallpaper" type) may be fixed, or may be selected or changed by the user and stored in field 328. The type of layout (such as gridded or continuous with push, as will be described later) may be fixed, or may be changed or selected by the user and stored in field 338. If the layout is a gridded layout, a grid map, which defines the resolution of the grid, may be fixed, or may be changed or selected by the user and stored in field 336. Finally, if the invention is to include an implicit query function, (as will be described later), a "match threshold" value may be fixed, or may be selected or changed by a user and stored in field 340.

Having described the state information, processes related to the input management process 210 are now described.

Referring back to FIG. 2, a user may interact with the user interface of the present invention using a pointing device, such as a mouse for example. The pointer input management process (or more generally, a "2D input facility") 214 provides user inputs, from the pointing device, to the input management process 210, either directly or through an event queue 216. The input management process 210 passes this information to a cursor location determination process (or more generally, a "cursor position locator") 218. The cursor location determination process 218 updates the cursor location value(s) or coordinates stored in the field 324.

Using the location of the cursor, as well as the locations of the objects stored in fields 308 of records 304 of the object information 302, the object state and location determination process (or more generally, an "object state update facility") 222 determines, for each object, whether the object is "active", "selected", or "moving". If an object is "moving", its location is updated. Further, if any object is "moving", an (total) occlusion avoidance process 224 is executed. Each of the object states is now described with reference to FIG. 17.

FIG. 17 is a state diagram of states and state transitions which the user interface of the present invention may use. Starting from an initial or default state 1700, if an object is activated, the object becomes "active" at state 1710. An object may become activated, for example, when a cursor is on, or passes over, or hovers over (note timer/clock facility 204.) an object thumbnail. The object may be "deactivated" when the cursor is taken off the object for example, in which case, the default state 1700 is reentered. Alternatively, if an active object is selected, for example by a mouse click, the object becomes "selected" at state 1720. In one embodiment, more than one object may be "selected" at a given time as will be discussed with reference to FIG. 14. If the object is deselected, for example by another mouse click, the state 1710 in which the object is "active" is reentered.

Referring to the "active" object state 1710, if the object is pulled or pushed, for example via a traditional left mouse button dragging operation, the "moving" state 1730 is entered. From the "moving" state 1730, if the pulled or pushed object is released, for example by releasing the left mouse button during a drag operation, the "active" state 1710 is reentered. When the object is in the "moving" state 1730, its location will be updated. Object occlusion may be avoided as follows.

Assuming that the layout type (Recall field 338) is "continuous with push", if the location or position of the moving object is within a predetermined distance of another object, the other object enters the "pushed" state 1740 and its location is updated so that (total) occlusion between the "moving" object and the "pushed" object is avoided. Note that a "pushed" object may cause other objects to be pushed. In one embodiment, if the moving object is no longer within the predetermined distance of the pre-push location of the other object, the other object is no longer "pushed" and takes on its pre-push location as shown by the dashed transition lines and state 1745. An animation may be used to move a pushed object from a current location to its pre-push location. The animation may take on the order of one (1) second. In another embodiment, the distance between the current location of the "pushed" object and the moving object is used to determine whether a "pushed" object continues to be "pushed". If, while a "moving" object is pushing a "pushed" object, the "moving" object is no longer pushed or pulled, for example, by releasing the left mouse button during a drag operation, the default state 1700 is reentered and objects previously "moved" and "pushed" are no longer in those respective states, and they are rendered at their last determined locations. If the object "moving" takes on a location beyond the predetermined distance of the other object being "pushed", that other object will no longer be "pushed". The foregoing assumed that the layout type was "continuous with push". Assuming, on the other hand, that the layout type is "gridded", an object may be continuously moved about the landscape. However, when the object is released, its position assumes the nearest open (i.e., not taken by another object) grid position. To reiterate, the grid may overlay the screen or the landscape and the resolution of the grid is stored in the grid map field 334.

Having described the stored state information 300, as well as the processes related to the input management process 210, the processes related to the output management process 250 are now described.

First, the output management process 250 provides the wall or screen information at storage means 272 to the video output process (or more generally, a "video output facility") 270 for rendering on a video monitor. For each object, the output management process 250 provides the video output process 270 with the location information, and the low resolution images in fields 404 of the object records 400 at storage means 274 to render the object thumbnails on the two-dimensional wall or screen.

If an object is "active", the output management process invokes the pop-up title bar generation process (or more generally, a "pop-up bar facility") 256 which accesses title (or other descriptive) information stored in fields 606 of records 600 stored in storage means 258. This title (or other descriptive) information is provided, via the output management process 250, to the video output process 270 so that a pop-up title bar, like that 1104 depicted in FIG. 11, may be rendered. Recall from FIG. 11 that a colored halo 1102 may also be rendered around an active object.

If the user interface of the present invention is to help a user to find objects related to an "active" object, the output management process invokes the implicit query process (or more generally, an "object matcher") 264, which may use matching (e.g., correlation or similarity) algorithms or heuristics, based on stored topic, or keywords, or contents of the object, or which may use predetermined object clusters, (See, e.g., field 704 of record 700.) stored in storage means 266, to determine objects related to the "active" objects. A co-occurrence method and a content-based method, each of which may be used by the implicit query process, are briefly introduced here. The first algorithm is derived from a page-to-page co-occurrence matrix based on a number (e.g., seven) of previous users'categorizations. Thus a pair of pages may match anywhere between 0 and n (e.g., seven) times, where n is the number of previous users'categorization. The algorithm essentially tells the user, "Other people thought these pages were related." For the content-based similarity computations, the known feature vector space model from information retrieval may be used. Objects may be pre-processed to remove the html markup. Words on a standard stop list of common words along with web-specific words may be omitted, and white space or punctuation may be used to delimit words. Phrases may also be used. Each object may be represented as a vector of words (and/or phrases) with entries representing the frequency of occurrence of a word (or a phrase) in that object. The similarity between objects may be measured by taking the cosine between the two object vectors—that is, the dot product of the vectors divided by the lengths of the objects. Objects may be considered to be "related" if the degree to which they match exceeds a match threshold stored in field 340. The display may render a control object, such as a slider for example, for permitting the user to vary the match threshold and see the objects found to be "related" to an active object. Alternatively, a filtering or sorting process may be used to determine objects related based on a property, such as size, creation date, last used date, directory location, etc., of the objects. Such related objects may be visually highlighted to the user, by providing a colored halo around such objects which matches the colored halo 1102 around the "active" object for example. Alternatively, the halo of related objects may use a different color, or a different shade of the same color, to distinguish them from the "active" object.

The degree to which objects match, as determined by the implicit query process 264, may also be depicted. Referring first to the display 1200A of FIG. 12A, the degree to which other objects match an "active" object (assuming, in this embodiment, that the degree of match exceeds the predetermined match threshold) may be depicted by rendering horizontal bar meters 1202 above (or below) the object thumbnails. FIG. 12B depicts a display 1200B in which segmented horizontal bar meters 1202' are used. FIG. 12C depicts a display 1200C in which horizontal slope bar meters 1202" are used. FIGS. 12D and 12E depict displays 1200D and 1200E, respectively, in which alternative horizontal bar meters 1202''' and 1202'''', respectively, are used to depict the degree to which other objects match an "active" object (assuming, in this embodiment, that the predetermined match threshold is exceeded). FIG. 12F is a display 1200F in which pie meters 1204 are used to depict the degree to which other objects match an "active" object (assuming, in this embodiment, that the predetermined match threshold is exceeded). FIG. 12G is a display 1200G in which dial meters 1206 are used to depict the degree to which other objects match an "active" object (assuming, in this embodiment, that the predetermined match threshold is exceeded). FIG. 12H is a display 1200H in which numbered (e.g., 1 through 10) tabs 1208 are used to indicate the degree to which other objects match an "active" object (assuming, in this embodiment, that the predetermined match threshold is exceeded). Note that in this case, the number "1" may correspond to the match threshold while the number "10" may correspond to a complete match. Alternatively, the number depicted may be directly based on the degree of match. FIGS. 12I and 12J are displays 1200I and 1200J, respectively, in which horizontal bar meters 1210 and 1210', respectively, are used to depict the degree to which other objects match an "active" object (assuming, in this embodiment, that the predetermined match threshold is exceeded). Bar coloring is used to indicate objects that were, at one time, located in close proximity to one another. This is discussed further later with reference to FIGS. 13B and 13C. FIG. 12K is a display 1200K in which dial meters 1214 are used to depict the degree to which other objects match an "active" object (assuming, in this embodiment, that the predetermined match threshold is exceeded). Coloring of the dials 1214 and colored squares 1216 are used to indicate objects that were, at one time, located in close proximity to one another. FIGS. 12L and 12M are displays 1200L and 1200M, respectively, in which the heights (or angle or area) of "roofs" 1218 and 1218', respectively, above object thumbnails are used to depict the degree to which other objects match an "active" object (assuming, in this embodiment, that the predetermined match threshold is exceeded). Referring further to FIGS. 12L and 12M, coloring of the balls 1220 and the roofs themselves, respectively, is used to indicate objects there were, at one time, located in close proximity to one another. FIG. 12N is a display 1200N in which vertical bar meters 1218' are used to depict the degree to which other objects match an "active" object (assuming, in this embodiment, that the predetermined match threshold is exceeded). Colored tabs 1220' at the upper left corner (or any other corner) of the objects are used to indicate objects that were, at one time, located in close proximity to one another.

In some alternatives, the degree to which other objects match an "active" object is not depicted—only whether or not an object matches an "active" object to a degree which exceeds the predetermined match threshold is depicted. In general, objects that do not match the "active" object to the predetermined match threshold are "deformed" in some way. For example, in the display 12000 of FIG. 12O, objects which do not match an "active" object to the predetermined match threshold are darkened 1224. In the display 1200P of FIG. 12P, objects which do not match an "active" object to the predetermined match threshold are blurred 1226. In the display 1200Q of FIG. 12Q, objects which do not match an "active" object to the predetermined match threshold are made translucent 1224'. In the display 1200R of FIG. 12R, objects which do not match an "active" object to the predetermined match threshold are colored by a gradient function 1228 which darkens from the top of the object to the bottom of the object. Similarly, in the display 1200S of FIG. 12S, objects which do not match an "active" object to the predetermined match threshold are colored by a gradient function 1228' which darkens from the left of the object to the right of the object. In the display 1200T of FIG. 12T, objects which do not match an "active" object to the predetermined match threshold are skewed 1230. In the display 1200U of FIG. 12U, objects 1232 which do not match an "active" object to the predetermined match threshold have a portion (e.g., a "bite") removed. Finally, in the display 1200V of FIG. 12V, objects 1234 which do not match an "active" object to the predetermined match threshold have a corner folded. Conversely, in FIG. 12W, objects which match an "active" object to the predetermined match threshold are provided with colored halos 1236.

Referring, once again, to FIG. 2, to provide further help to the user, it may be assumed that users will position related objects in close proximity. The output management process 250 may invoke the proximity cluster determination process (or more generally, a "proximity clustering facility") 268 to cluster object thumbnails based on proximity. When clustering object thumbnails based on proximity, the present invention may consider, inter alia, object thumbnail position, relative proximity to other object thumbnails, and/or relative separation (or "white space") from other object thumbnails. The clustering may be transitive. That is, if objects A and B are proximally clustered, and objects B and C are proximally clustered, then objects A and C are proximally clustered. Note that the proximity clustering determination process 268 differs from matching (e.g., correlation) which may be done by the implicit query process 264. More specifically, the implicit query process 264 is concerned with predetermined clusters or groupings based on the subject matter, keywords, or content of the objects. On the other hand, the proximity cluster determination process 268 is only concerned with where a user has placed an object. Consequently, even seemingly unrelated objects may be clustered. Thus, the user interface of the present invention is based, in part, on the recognition that a user may have non-intuitive or non-objective reasons for grouping objects. That is, the user is not confined to a "right way" to organize objects.

A way to graphically depict proximity clustering is shown in FIGS. 13A and 13B. FIG. 13A depicts a display 1300A in which object thumbnails are arranged on a wall. FIG. 13B is a display 1300B in which object thumbnails, clustered based on their proximity, are cordoned off from other object thumbnails using colored ring borders 1302A and 1302B. In this way, a cluster of object thumbnails can be readily discerned and can be manipulated (e.g., selected, dragged, dropped) together, as a group.

Note that a user may want the visual indication of proximally located objects to persist, even when an object is moved away from the others, until the cluster of (formerly) proximally located objects is "broken" by a user command. Referring to FIG. 13C, the two (2) groups of proximally located objects are moved away from the (formerly) proximally located objects, the visual indicators persist as stretched rings 1302A' and 1302B'. In this way, the user can move (formerly) proximally located objects back together again, or, break the cluster of (formerly) proximally located objects. Referring back to FIG. 12I, recall that proximal clusters may be indicated by bars 1212 having matching colors. Referring back to FIG. 12J, recall that proximal clusters may be indicated by bars meters 1212' having matching colors. Referring back to FIG. 12K, recall that proximal clusters may be indicated by squares 1216 or dial meters 1214 having matching colors. Referring back to FIG. 12L, recall that proximal clusters may be indicated by balls 1220 having matching colors and arranged on roofs 1218. Finally, referring back to FIG. 12M, recall that proximal clusters may be indicated by roofs 1218' having matching colors. Note that in FIGS. 12I through 12M, objects that were formerly in close proximity to one another have, in some cases, been moved apart.

FIG. 14 is a display 1400 in which titles are displayed for multiple object thumbnails at one time. This may be initiated by the user selecting a single object thumbnail after which the application (e.g., using the implicit query function) highlights object thumbnails or by the user selecting more than one thumbnail at a given time. A single pop-up window 1402 having a list of titles (or other descriptive text) 1410 is used to indicate neighboring object thumbnails. Visual links 1408 are provided from each title 1410 to its associated object thumbnail. In addition, numbers 1412 preceding the text 1410 are associated with numbers 1404 depicted adjacent to the object thumbnails. A partial halo 1406 is rendered around each of the selected thumbnails. Finally, note that the pop-up window 1402 may be translucent such that object thumbnails behind it are not occluded.

Referring back to FIG. 2, if an object is "deselected", a preferred object viewing process (or more generally, a "preferred object viewer") 254 is invoked by the output management process. The preferred object viewing process moves the object thumbnail associated with the "selected" object to a preferred viewing location on the display. Recall from FIG. 10 that a "selected" object is rendered in the center of display as an enlarged image. The low resolution image of the object may be replaced with the high resolution image of the object. Also recall that the thumbnail may display alternative representations of the content from a given object such as schematic or iconic views. To facilitate consistency of the user interface to the user, a movement animation may be used and may last about one second. During this enlargement, a natural transition via hardware or software supported blending may also be supported. The moved object thumbnail may, alternatively, be the actual object "live" on an associated application, such as an HTML page on an Internet browser, a text document on a word processor, a spreadsheet on an accounting application, etc. Also recall that the object thumbnail may display alternative representations of the object, such as iconic or schematic views. During a movement to the actual object, "live" in its associated application, a transition animation may employ blending or morphing.

Figure 8:
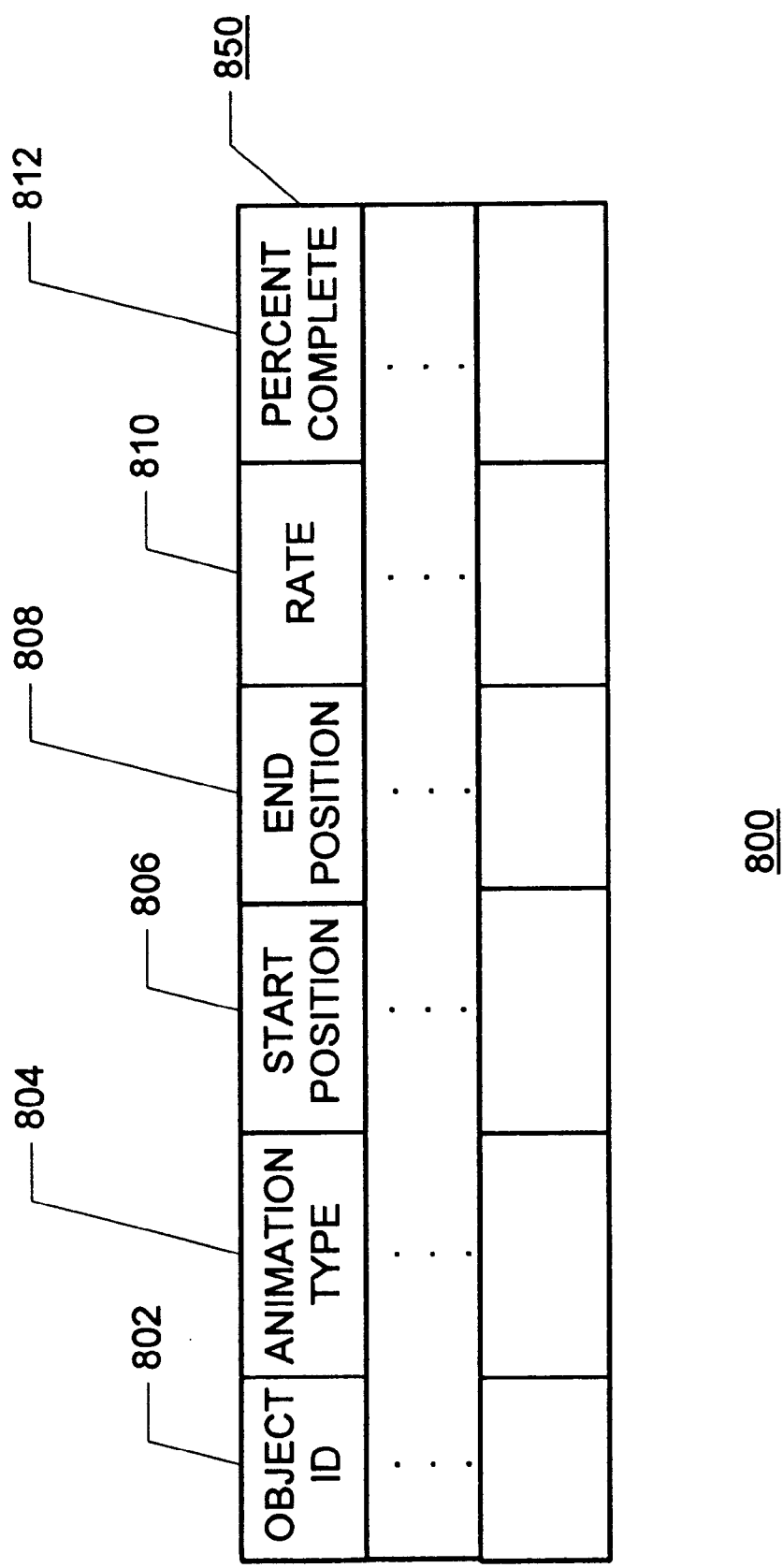
FIG. 8 illustrates an exemplary data structure for storing animations which may be used by the present invention.

Referring to FIG. 8, each object has an animation record 850, which may be stored collectively as animation files 800. Each animation record 850 may include a field 802 for identifying the object, a field 804 for defining an animation type (e.g., morph, blend, enlarge, shrink, etc.), a field 806 for defining a start position (e.g., the object's location), a field 808 for defining an end position (e.g., the center foreground), a field 810 for defining the rate of the animation (e.g., total time=1 second), and a field 812 for tracking the percent complete (i.e., a current state) of the animation.

Finally, recall that audio cues may be used. This may be carried out by the audio cue process (or more generally, an "audio cue player") 260 and audio output process 278 which may use stored audio data (not shown). When an object is "activated", an associated audio cue is played. This may be an abstract percussive "pong" sound. When an object is "selected", the movement animation may be accompanied by an associated audio cue. This may be an abstract "whoosh" sound of increasing pitch and loudness in which the parameters of a flanger effect are changed over the duration of the sound. When a "selected" object is deselected, an animation, moving the object away from the user so that it appears smaller, may be accompanied by an associated audio cue. This may be a reversed version of the "whoosh" sound. When an object is being "moved", an associated audio cue may be played. This may be an oscillating electronic hum. The pitch of the oscillating hum may vary with the speed at which the object thumbnail is being moved. Left/right (or up/down) balance of the audio may be varied based on the relative position of the object on the screen. When an object is initially "moving", a mechanical latching sound cue may be played. When the object transitions out of a "moving" state, a mechanical unlatching sound cue may be played. When an object is being "pushed", an associated audio cue (e.g., based on a shuffling card sound) may be played.

Although the processes discussed above were described as being run by input and output management processes, as is apparent to those skilled in the art, certain of the operations can be combined or can be separated out.

Figure 1:
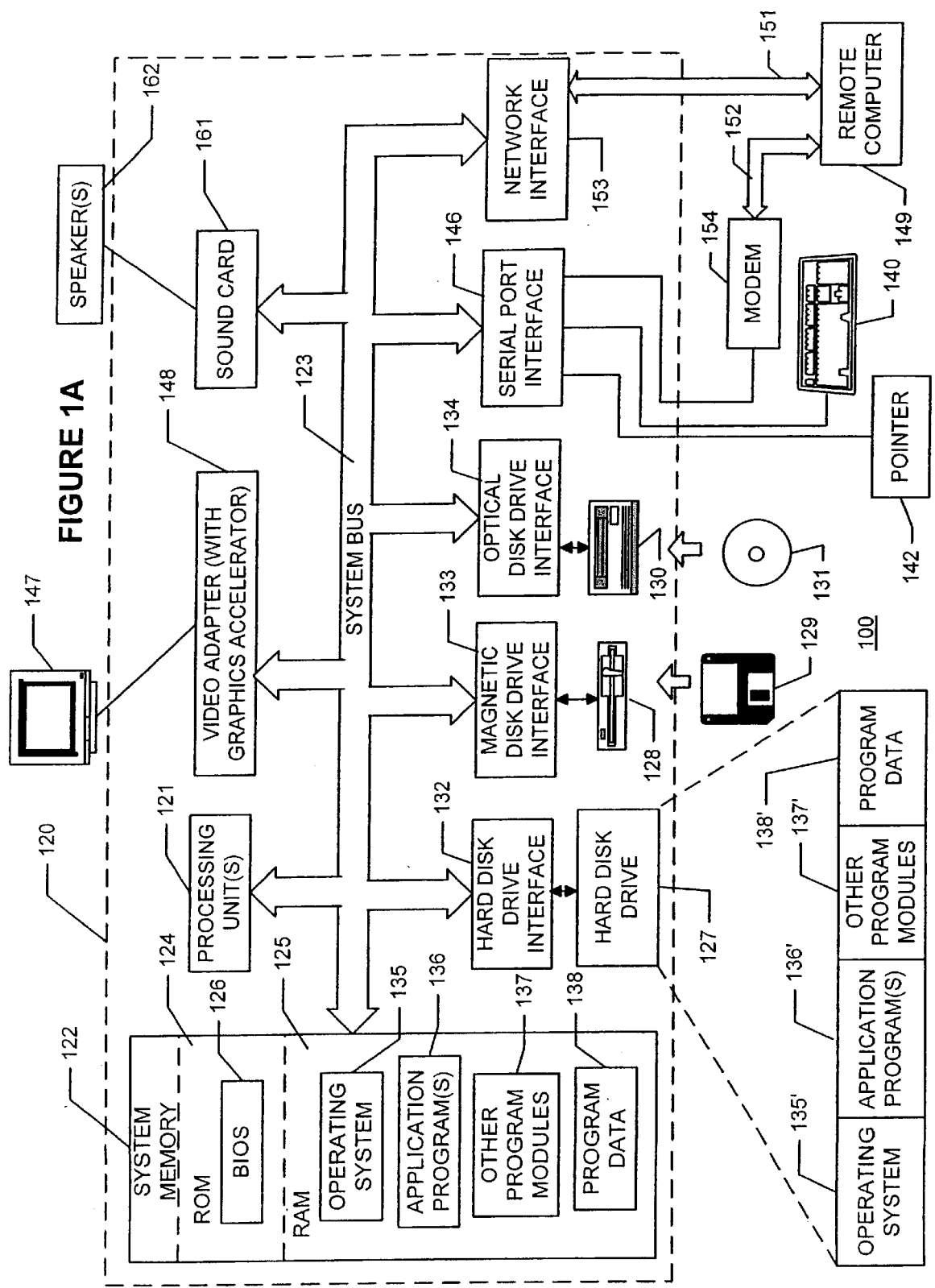
FIG. 1A is a personal computer on which the user interface of the present invention may be effected.
FIG. 1B is a machine on which the user interface of the present invention may be effected.

In the context of the personal computing environment 100 of FIG. 1, the processes discussed with reference to FIG. 2 may be carried out by the following facilities. The poipter input process 214 may be performed, at least in part, by the pointer 142, the serial port interface 146 and program modules 137. All data may be stored on any of the storage or memory devices or may be received from a remote source. The video output process 270 may be performed, at least in part, by program modules 137, the video adapter 148, the graphics accelerator, and the video monitor 147. The audio output process 278 may be performed, at least in part, by program modules 137, the sound card 161 and the speaker(s) 162. All other process may be effected by program modules 137 and application programs 136 (which may be written in C++) executed on the processing units 121.

§ 4.2.4 EXEMPLARY METHODOLOGIES

Having described various displays and processes above, methodologies for effecting at least some of the processes are now described with reference to FIGS. 15, 16, 18A and 18B.

FIG. 15, which includes FIGS. 15A and 15B, is a flow diagram of an exemplary animation loop process in which processing is initiated at node 1500. First, as shown in step 1502, a next event or task is taken from an event queue. (Recall, e.g., event queue 216 which accepts pointer inputs.) Next, decision step 1508 is entered. At decision step 1508, it is determined whether or not a exit command was entered by the user. If so, processing exits the process 1500 via return node 1510. If, on the other hand, no exit command was entered by the user, processing continues at decision step 1514. At decision step 1514, it is determined whether or not the cursor is located "on" (or hovers over) an object (thumbnail). (Recall timer/clock facility 204.) If not, no objects can be active, nor can any object be moving. Records (e.g., 304) of objects may be updated to reflect this fact in step 1516. Processing then continues, via node A 1518, to step 1538 which generates a display and audio based on current object states (and other stored information) and the cursor location. (Recall, e.g., state information 300 and output management process 250.) Step 1538 is discussed in more detail with reference to FIG. 16. Processing then continues, via node C 1540, to step 1502.

Returning to decision step 1514, if the cursor is located on (or is hovering over) an object, the object is "active" (and therefore, other objects may be not "active".) Records (e.g., 304) of objects may be updated to reflect this fact in step 1520. Next, at decision step 1522, it is determined whether or not the "active" object is "selected". If so, then the object is "selected" (and therefore, other objects may be not "selected"). Records (e.g., 304) of objects may be updated to reflect this fact in step 1524. Processing continues, via node A 1518, to step 1538 introduced above.

Returning to decision step 1522, if the "active" object is not "selected", processing continues, via node B 1526, to decision step 1528. At decision step 1528, it is determined whether or not the "active", but not "selected", object is "moving" (or being dragged). If not, processing continues to decision step 1560 which determines whether or not the object just transitioned from "moving" to "not moving". That is, decision step 1560 determines whether or not the object was dragged (i.e., moving) in the last cycle. If so, as shown at step 1562, the location(s) of the object(s) are stored to a persistent storage means (See storage device 290 of FIG. 2.), and processing continues at decision step 1550. Otherwise, processing continues directly to decision step 1550. At decision step 1550, it is determined whether an animation is running. If so, as shown in step 1552, the animation is updated (Recall records 850.) and processing continues to step 1538 introduced above. If not, processing continues directly to step 1538. Returning to decision step 1528, if the object is being "moved", then no other objects will be "moving" (though they may be "pushed" as discussed below). Records (e.g., 304) of objects are updated to reflect this fact in step 1530. The object's new location is determined in step 1532.

Recall that total object (thumbnail) occlusion should be avoided. In decision step 1534, it is determined whether or not the "active" and "moved" object is within a predetermined distance (in the virtual three-dimensional space, or in a two-dimensional projection of the virtual three-dimensional space) of any other object. If not, processing continues at step 1550. If, on the other hand, the "active" and "moved" object is within a predetermined distance of another object(s), total object (thumbnail) occlusion is avoided in step 1536 and processing continues at step 1550. Exemplary processes for avoiding object occlusion are discussed below with reference to FIGS. 18A and 18B.

FIG. 18A is a flow diagram of an exemplary process 1536' for avoiding object (thumbnail) occlusion assuming a "continuous with push" layout type. (Recall field 338.) First, at decision step 1802, it is determined whether or not the "active" and "moving" object has moved (a predetermined distance) away from a stored location (or, in an alternative embodiment, the present location) of the other object. If not, as shown in step 1808, the other object is "pushed" and the record (e.g., 304) of the other object is updated to reflect this fact. Further, in one embodiment, the pre-push location of the "pushed" object is stored. (Recall, e.g., field 310 of FIG. 3.) Then, as shown in step 1812 the location of the "pushed" object is updated to maintain at least a predetermined minimum distance between it and the "active" and "moving" object. (Recall location field 308.) The "pushed" object may move out of the way of the "moved" object by effecting an animation, which may last about one section. Alternatively, the faster the "moved" object is moving, the faster the "pushed" objects may move aside. Thus, in this embodiment, the "moved" object is like a person walking or running through tall grass (pushed objects) which move out of the person's way but resume their position after the person leaves. The process 1536' is then exited via return node 1806.

Returning to decision step 1802, in this embodiment, if the "active" and "moving" object has moved away from the pre-push location (e.g., stored in field 310 of the record 304 of the "pushed" object), of the "pushed" object, then the location of the "pushed" object (e.g., location field 308) is set back to its pre-push location. This may be effected with an animation which may take about one half of a second.

FIG. 18B is a flow diagram of an alternative exemplary process 1536" for avoiding object (thumbnail) occlusion, again assuming a "continuous with push" layout type. (Recall field 338.) First, as shown in step 1852, the other object is indicated as being "pushed". Next, in step 1854, the location of the other object is updated to maintain at least a minimum distance between it and the "moved" object. Then, at decision step 1856, it is determined whether the updated location of the "pushed" object is within a predetermined distance of a location of any other objects. If so, those further objects must also be "pushed" to avoid total occlusion by, or to avoid totally occluding, the "pushed" object, and processing continues at step 1852. That is, the minimum distance condition is transitively propagated, if necessary, to displace neighboring object thumbnails. Otherwise, the process 1536" is exited via return node 1858.

In this alternative way of avoiding object occlusion, the pre-push position of object thumbnails need not be stored. When a moving operation ceases (e.g., when the left mouse button is released during a drag operation), all object thumbnails maintain their location at that time.

Assuming that a "gridded" layout is used instead of a "continuous with push" layout, when an active object is released, it is anchored to the nearest available (i.e., having no other anchored object) grid point. In this way, total object occlusion is avoided. One object may partially occlude another(s). Although any one of a number of partial occlusion rules may be used (e.g., higher/lower object covers lower/higher object, left/right object covers right/left object, older/ newer object covers newer/older object, more/less recently used object covers less/more recently used object etc.), once such a rule is selected, it should be uniformly applied.

FIG. 16, which includes FIGS. 16A through 16C, is a flow diagram of an exemplary process 1538' for generating an audio and video output. First, as shown in step 1602, the cursor is displayed at its location. (Recall cursor location determination process 218, cursor location field 324, and video output process 270.) Next, as shown in step 1604, a two-dimensional screen or wall, with landmarks, is displayed. (Recall storage means 272, video output process 270, and display 900.) Next, a loop in which all objects are processed is run. The object loop is initialized at step 1606 by initializing an object count value (OB_CT=1). Next, in step 1610, the object (thumbnail) is displayed anchored at its location.

Processing continues at decision step 1612 where it is determined whether or not the object being processed is "active". (Recall field 312.) If not, processing continues, via node C 1616, to decision step 1632 at which it is determined whether the object being processed is "selected". (Recall field 314.) If so, a high resolution version of the moved object thumbnail is ultimately displayed at the preferred viewing location 1634 by progressing through the animation associated with the object (unless the animation is 100 percent complete). Recall that, in an alternative embodiment, a "live" object may be loaded into an associated application and then displayed. If the object being processed underwent a "not selected" to "selected" transition, the movement animation and associated audio cue may be played. To determine transitions, the object's previous state may be used.

From step 1634, or from decision step 1632 if the object being processed is not "selected", the object indexing count is incremented (OB_CT=OC_CT+1) at step 1640. Then, as shown in step 1642, if all of the objects have been processed (OB_CT>MAXIMUM OB_CT; Recall field 326.), then the process 1438' is exited via return node 1646. If, on the other hand, more objects need to be processed, processing continues, via node A 1644, to step 1610.

Returning to decision step 1612, if the object being processed is "active", then processing continues, via node B 1614, to step 1618 in which a pop-up title bar is displayed over the object (thumbnail). Next, at decision step 1620, it is determined whether the object being processed just-transitioned to the "active" state from an inactive state. Recall that to determine transitions, the object's previous state may be used. If so, an activation audio cue is played as shown in step 1622. From step 1622, or from decision step 1620 if the object was already "active", step 1624 is performed. In step 1624, a colored halo is displayed around the periphery of the object (thumbnail). (Recall 1104.) Next, in step 1626 if other objects are found to match the active object to a predetermined degree (Recall match threshold 340.), visual indications of such a match (or non-match) are rendered. (Recall implicit query process 264 and FIGS. 12A through 12W.)

Next, as shown at decision step 1628, if the object being processed is "moving" (Recall field 316.), associated audio is played as shown in step 1630. Recall also that transitions to and from the "moving" state may be accompanied by mechanical latching and unlatching, respectively, audio cues. From step 1630, or from decision step 1628 if the object being processed is not "moving", processing continues via node C 1616 to step 1632 where processing is carried out as discussed above.

§ 4.3 SUMMARY

As illustrated in the foregoing description, the present invention provides a user interface, and in particular a graphical user interface, to information or content (also referred to as an "object"). The present invention permits a user to view and organize all objects and to edit or otherwise work on a selected object by, for example, representing, graphically, objects or content with object thumbnail which can be added, moved, or deleted from a display rendered on a video monitor. The present invention may use pop-up title bars for permitting a user to discern more about the object represented by the object thumbnail. The present invention may use higher resolution image representations of objects, or "live" objects loaded within an associated application, for editing or otherwise working on a selected object.

The user interface of the present invention exploits spatial memory by, for example, providing a two-dimensional wall or screen on which the object thumbnails may be manipulated. The wall or screen may include visual (and audio) landmarks for enhancing a user's spatial memory.

The user interface of the present invention is intuitive and minimizes the time needed for a user to become familiar with it. The user interface of the present invention is neither cumbersome, nor does it require too many different types of inputs to manipulate the object thumbnails. For example, the present invention may use inputs from a familiar input device such as a mouse or pointer to manipulate the object thumbnails. The present invention may also prevent one object thumbnail (or landscape feature) from totally occluding another object thumbnail so that neither is (totally) hidden from the user.

Finally, the user interface of the present invention can provide intelligent help to the user. For example, the present invention may cluster, by rendering a visual boundary for example, object thumbnails which are arranged, by the user, relatively close to one another. Further, the present invention may employ a matching (e.g., correlation or similarity) algorithm to determine whether certain objects are related. Alternatively, objects may be related by an explicit selection or designation by a user. If so, the present invention may employ some type of visual indicator(s) of "matching" (or non-matching) objects. This visual indication may be rendered upon an event, such as when an object thumbnail is activated.

Thus, the present invention represents an advance in the area of user interfaces.

What is claimed is:

1. A man-machine interface method for permitting a user to act on thumbnails, each thumbnail associated with an object containing information and being a scaled image of the associated object, for use with a machine having a video display device and a user input device, and being able to read from and write to a persistent storage device and a non-persistent storage device, the man-machine interface method comprising steps of:

a) generating a two-dimensional wall to be rendered on the video display device;

b) determining a location, having two coordinates defining a location on the two-dimensional wall, of each of the thumbnails on the two-dimensional wall;

c) generating the thumbnails on the two-dimensional wall, at the determined locations, to be rendered on the video display device;

d) storing, for each of the thumbnails, associated location and state information to the non-persistent storage device; and e) for each of the thumbnails not being moved, storing the determined location of the thumbnail to the persistent storage device.

2. The man-machine interface method of claim 1 further comprising steps of:
   e) accepting inputs from the user input device;
   f) determining a cursor location based on the accepted inputs;
   g) generating a cursor at the determined cursor location, to be rendered on the video display device; and
   h) if the cursor is located on one of the thumbnails, defining that thumbnail as an active thumbnail.

3. The man-machine interface method of claim 2 further comprising a step of:
   i) generating a pop-up textual information bar located over the active thumbnail, to be rendered on the video display device.

4. The man-machine interface method of claim 2 further comprising a step of:
   i) if the user input provides a selection input and if an active thumbnail exists, then generating a higher resolution visual representation of the object represented by and associated with the active thumbnail, at a preferred viewing location on the two-dimensional wall, to be rendered on the video display device.

5. The man-machine interface method of claim 4 wherein the selection input is a mouse click.

6. The man-machine interface method of claim 4 wherein the step of generating the higher resolution visual representation of the object represented by and associated with the active thumbnail includes a sub-step of:
   generating an animation which moves the higher resolution visual representation of the object represented by and associated with the active thumbnail from the location of the active thumbnail to the preferred viewing location, to be rendered on the video display device.

7. The man-machine interface method of claim 6 further comprising a step of:
   j) if the user input provides a deselection input and if a selected thumbnail exists, then generating a video output for moving the high resolution visual representation of the object represented by and associated with the selected thumbnail to the location of the active thumbnail, to be rendered on the video display device.

8. The man-machine interface method of claim 7 wherein the deselection input is a mouse click.

9. The man-machine interface method of claim 2 further comprising a step of:
   i) if the user input provides a selection input and if an active thumbnail exists, then
      i) invoking an application related to the object represented by and associated with the active thumbnail,
      ii) loading the object represented by and associated with the active thumbnail into the application, and
      iii) generating a video output of the application with the loaded object represented by and associated with the active thumbnail at a preferred viewing location, to be rendered on the video display device.

10. The man-machine interface method of claim 9 wherein the selection input is a mouse click.

11. The man-machine interface method of claim 2 further comprising a step of:
    i) if the user input provides a move input and if an active thumbnail exists, then
       i) updating a location of the active thumbnail based on the move input.

12. The man-machine interface method of claim 11 wherein the move input is a pointer drag.

13. The man-machine interface method of claim 11 wherein as a thumbnail is moved,
    its location is continuously updated, and
    outputs of the thumbnail at the updated locations to be rendered on the video display device are generated, such that the position of the object is continuously fed back to a user via the video display device.

14. The man-machine interface method of claim 2 further comprising the steps of:
    i) determining a degree to which each one of the other thumbnails is related to the active thumbnail;
    j) for each one of the other thumbnails, comparing the degree of match to a predetermined threshold to determine whether said each other one of the thumbnails matches the active thumbnail; and
    k) generating visual cues, to be rendered on the video display device, for associating the active thumbnail and the other ones of the thumbnails matching the active thumbnail, wherein each of the visual cues depicts more than two degrees of relatedness.

15. The man-machine interface method of claim 14 further comprising a step of:
    1) providing a tool, to be rendered on the video display device, for permitting a user to change the predetermined threshold.

16. The man-machine interface method of claim 14 wherein the generated visual cue, to be rendered on the video display device, is selected from a group of visual cues consisting of (a) a horizontal bar meter, indicating a degree of match and positioned over the visual representation of each one of the other thumbnails matching the active thumbnail, (b) a horizontal sloped bar meter, indicating a degree of match and positioned over the visual representation of each one of the other thumbnails matching the active thumbnail, (c) a pie meter, indicating a degree of match and positioned over the visual representation of each one of the other thumbnails matching the active thumbnail, (d) a roof meter, the height of which indicates a degree of match and positioned over the visual representation of each one of the other thumbnails matching the active thumbnail, (e) a vertical bar meter, indicating a degree of match and positioned close to the visual representation of each of the other thumbnails matching the active thumbnails, and (f) a dial meter, indicating a degree of match and positioned close to the visual representation of each of the other thumbnails matching the active thumbnail.

17. The man-machine interface method of claim 2 further comprising the steps of:
    i) determining a degree to which each of the other thumbnails is related to the active thumbnail; and
    j) for each one of the other thumbnails, generating a visual degree of match indicator, to be rendered on the video display device adjacent to the visual representation of said each one of the other thumbnails,
    wherein each of the visual degree of match indicators depicts more than two degrees of match.

18. The man-machine interface method of claim 17 wherein the visual degree of match indicator is selected from a group of visual indicators consisting of (a) a horizontal bar meter, (b) a horizontal sloped meter, (c) a pie meter, (d) a roof meter, (e) a vertical bar meter, and (f) a dial meter.

19. The man-machine interface method of claim 1 wherein the thumbnails are low resolution bit maps.

20. The man-machine interface method of claim 19 wherein the low resolution bit maps are 64 pixels by 64 pixels and have 24 bit color.

21. The man-machine interface method of claim 1 wherein the objects are selected from a group consisting of (a) an HTML document, (b) a database record, (c) a word processor document, or (d) a contact.

22. The man-machine interface method in claim 1 further comprising the steps of:
   e) determining clusters of visual representations of said thumbnails located in close proximity to one another; and
   f) generating a visual indicator, to be rendered on the video display device, of any of the clusters so determined, wherein the visual indicator is separate and distinct from the visual representations of said thumbnails.

23. The man-machine interface method of claim 22 wherein the step of determining clusters is performed based on at least one factor selected from a group of factors consisting of: (a) a distance between a location of one of the thumbnails and a location of another one of the thumbnails, and (b) distances between the location of said one thumbnail and locations of all other ones of the thumbnails.

24. The man-machine interface method in claim 1 further comprising the steps of:
   e) determining clusters of visual representations of said thumbnails located in close proximity to one another; and
   f) generating a visual indicator, to be rendered on the video display device, of any of the clusters so determined, wherein the visual indicator leaves positions of said thumbnails unchanged.

25. A system which permits a user to interact with thumbnails associated with objects containing information and being a scaled image of the associated object, the system comprising:
   a) an input facility for accepting user inputs;
   b) a non-persistent storage facility containing
      i) corresponding location and state information for each of the thumbnails, and
      ii) a cursor location;
   c) a persistent storage facility containing
      i) a two-dimensional wall, and
      ii) a location, having two coordinates defining a location on the two-dimensional wall, of each of the thumbnails not being moved;
   d) a processing unit which
      i) accepts user inputs from the input facility,
      ii) updates (a) the corresponding location and state information for each of the thumbnails contained in the non-persistent storage facility, and (b) the cursor location contained in the non-persistent storage facility, based on the accepted user inputs,
      iii) when one of the thumbnails transitions from moving to not moving, updates the corresponding location of each of the thumbnails contained in the persistent storage facility, and
      iv) generates video outputs based on
         A) the location and state information for each of the thumbnails,
         B) the cursor location, and
         C) the two-dimensional wall, stored in the non-persistent storage facility, such that, when the video outputs are applied to a video display unit, each of the thumbnails will be displayed at the corresponding location on the wall; and
   e) a video display unit for rendering the video outputs generated by the processing unit.

26. The system of claim 25 wherein the state information for each of the thumbnails contained in the non-persistent storage facility includes an indication of whether or not the thumbnail is active, and
   wherein the processing unit determines that a thumbnail is active if a cursor is on a thumbnail based on the cursor location and the location of the thumbnail.

27. The system of claim 26 wherein the persistent storage facility further contains descriptive textual information for each of the thumbnails, and
   wherein, if a thumbnail is active,
      i) the processing unit generates a pop-up bar, based on descriptive textual information, for the active thumbnail, and
      ii) the video display unit renders the pop-up bar over the rendered thumbnail.

28. The system of claim 26 wherein, if a thumbnail is active and the input facility accepts a selection input, then
   i) the processing unit updates the state of the thumbnail,
   ii) the processing unit gets a second, higher resolution, visual representation of the object represented by and associated with the thumbnail,
   iii) the processing unit generates a video output based on the higher resolution, visual representation of the object represented by and associated with the thumbnail at a preferred viewing location, and
   iv) the video display device renders the video output generated by the processing unit.

29. The system of claim 28 wherein each thumbnail is a 64 pixel by 64 pixel bit map having 24 bit color and wherein each higher resolution, visual representation of the objects is a 512 pixel by 512 pixel bit map having 24 bit color.

30. The system of claim 28 wherein the processing unit further effects a video output based on an animation of the higher resolution, visual representation of the object represented by and associated with the thumbnail, moving from the location of the thumbnail to a location at a center of the two-dimensional wall.

31. The system of claim 28 wherein the input facility includes a mouse and wherein the selection input is a mouse click.

32. The system of claim 28 wherein, if a thumbnail is active and the input facility accepts a move input, then
   i) the processing unit updates the state and location of the thumbnail in the non-persistent storage facility,
   ii) the processing unit generates a video output based on the updated location of the thumbnail, and
   iii) the video display device renders the video output generated by the processing unit.

33. The system of claim 32 wherein the input facility is a pointer and wherein the move input is a pointer drag.

34. The system of claim 32 wherein as a thumbnail is moved,
   the processing unit continuously updates the location of the thumbnail stored in the non-persistent storage facility,
   the processing unit generates video outputs of the thumbnail at the updated locations, and the video display device renders the video outputs generated by the processing unit, such that the position of the object is continuously fed back to a user via the video display device.

35. The system of claim 26 wherein, if a thumbnail is active and the input facility accepts a selection input, then
   i) the processing unit updates the state of the thumbnail,
   ii) the processing unit opens an application with which the object, associated with and represented by the thumbnail, is associated,
   iii) the processing unit loads the object into the application,
   iv) the processing unit generates a video output based on the object loaded onto the opened application and a preferred viewing location, and
   v) the video display device renders the video output generated by the processing unit.

36. The system of claim 35 wherein the input facility includes a mouse and wherein the selection input is a mouse click.

37. The system in claim 26 wherein, if the thumbnail is active;
   i) the processing unit determines whether any other ones of the thumbnails match, to a predetermined degree, the active thumbnail; and
   ii) the video display unit renders visual indicators for visually associating any of said other thumbnail matching, to a predetermined degree, the active thumbnail, wherein each of the visual indicators depicts more than two degrees of match.

38. The system in claim 26, wherein if a thumbnail is active:
   i) the processing unit determines, for each of the thumbnails other than the active thumbnail, the degree to which said each of the other thumbnails matches the active thumbnail; and
   ii) the processing unit generates, for each one of the thumbnails other than the active thumbnail, a visual degree of match indicator, to be rendered on the video display device adjacent to the visual representation of said one thumbnail, wherein each of the degree of match indicators depicts more than two degrees of match.

39. The system of claim 38 wherein the visual degree of match indicator is selected from a group of visual indicators consisting of (a) a horizontal bar meter, (b) a horizontal sloped meter, (c) a pie meter, (d) a roof meter, (e) a vertical bar meter, and (f) a dial meter.

40. The system in claim 25 wherein the processing unit further:
   groups ones of the thumbnails based on their proximity to one another so as to form at least one group of thumbnails;
   generates a visual effect for indicating said one group of thumbnails, the visual effect being separate and distinct from said thumbnails; and
   generates a video output based on the visual effect,
   wherein the video display unit renders the video output generated by the processing unit.

41. The system in claim 25 wherein the processing unit further:
   groups ones of the thumbnails based on their proximity to one another so as to form at least one group of thumbnails;
   generates a visual effect for indicating said one group of thumbnails, wherein the visual effect leaves positions of said thumbnails unchanged; and
   generates a video output based on the visual effect,
   wherein the video display unit renders the video output generated by the processing unit.

42. A machine readable medium containing data and machine executable instructions which, when executed by a machine that can read from and write to a persistent storage device and a non-persistent storage device, perform steps comprising:
   a) generating a two-dimensional wall to be rendered on the video display device;
   b) determining a location of each of the thumbnails on the two-dimensional wall;
   c) generating the thumbnails on the two-dimensional wall, at the determined locations, to be rendered on the video display device;
   d) storing, for each of the thumbnails, associated location and state information to the non-persistent storage device; and
   e) for each of the thumbnails not being moved, storing the determined location of the thumbnail to the persistent storage device,
      wherein, each thumbnail is associated with an object containing information and is a scaled image of the associated object.

43. The machine readable medium of claim 42, including further instructions which, when executed by a machine, further perform steps of:
   e) accepting inputs from the user input device;
   f) determining a cursor location based on the accepted inputs;
   g) generating a cursor at the determined cursor location, to be rendered on the video display device; and
   h) if the cursor is located on one of the thumbnails, defining that thumbnail as an active thumbnail.

44. The machine readable medium of claim 43, including further instructions which, when executed by a machine, further perform a step of:
   i) if the user input provides a selection input and if an active thumbnail exists, then generating a higher resolution visual representation of the object represented by and associated with the active thumbnail, at a preferred viewing location on the two-dimensional wall, to be rendered on the video display device.

45. The machine readable medium of claim 44, wherein the selection input is a mouse click.

46. The machine readable medium of claim 45, wherein the step of generating the higher resolution visual representation of the object represented by and associated with the active thumbnail includes a sub-step of:
   generating an animation which moves the higher resolution visual representation of the object represented by and associated with the active thumbnail from the location of the active thumbnail to the preferred viewing location, to be rendered on the video display device.

47. The machine readable medium of claim 46, including further instructions which, when executed by a machine, further perform a step of:
   j) if the user input provides a deselection input and if a selected thumbnail exists, then generating a video output for moving the high resolution visual representation of the object represented by and associated with the selected thumbnail to the location of the active thumbnail, to be rendered on the video display device.

48. The machine readable medium of claim 47 wherein the deselection input is a mouse click.

49. The machine readable medium of claim 43, including further instructions which, when executed by a machine, further perform steps of:

i) if the user input provides a selection input and if an active thumbnail exists, then
  i) invoking an application related to the object represented by and associated with the active thumbnail,
  ii) loading the object represented by and associated with the active thumbnail into the application, and
  iii) generating a video output of the application with the loaded object represented by and associated with the active thumbnail at a preferred viewing location, to be rendered on the video display device.

50. The machine readable medium of claim 49 wherein the selection input is a mouse click.

51. The machine readable medium of claim 43, including further instructions which, when executed by a machine, further perform steps of:

i) if the user input provides a move input and if an active thumbnail exists, then
  i) updating a location of the active thumbnail based on the move input.

52. The machine readable medium of claim 51 wherein the move input is a pointer drag.

53. The machine readable medium of claim 52 wherein as a thumbnail is moved, its location is continuously updated, and outputs of the thumbnail at the updated locations to be rendered on the video display device are generated, such that the position of the object is continuously fed back to a user via the video display device.

54. The machine readable medium of claim 43, including further instructions which, when executed by a machine, perform the further steps of:

i) determining a degree to which each of the other thumbnails is related to the active thumbnail;

j) for said each of the other thumbnails, comparing the degree of match to a predetermined threshold to determine whether said each other thumbnail matches the active thumbnail; and k) generating visual cues, to be rendered on the video display device, for associating the active thumbnail and other ones of the thumbnails matching the active thumbnail, wherein each of the visual cues depicts more than two degrees of relatedness.

55. The machine readable medium of claim 43, including further instructions which, when executed by a machine, perform the further steps of:

i) determining a degree to which each of the other thumbnails is related to the active thumbnail; and j) for each one of the thumbnails other than the active thumbnail, generating a visual degree of match indicator, to be rendered on the video display device adjacent to the visual representation of said each other thumbnail, wherein each of the visual degree of match indicators depicts more than two degrees of match.

56. The machine readable medium of claim 42, including further instructions which, when executed by a machine, further perform a step of:

i) generating a pop-up textual information bar located over the active thumbnail, to be rendered on the video display device.

57. The machine readable medium of claim 42 wherein the thumbnails are low resolution bit maps.

58. The machine readable medium of claim 57 wherein the low resolution bit maps are 64 pixels by 64 pixels and have 24 bit color.

59. The machine readable medium of claim 42, wherein the objects are selected from a group consisting of (a) an HTML document, (b) a database record, (c) a word processor document, or (d) a contact.

60. The machine readable medium of claim 42 further comprising machine readable instructions for performing the further steps of:

e) determining clusters of visual representations of ones of the thumbnails located in close proximity to one another; and f) generating a visual indicator of any of the clusters so determined, wherein the visual indicator is separate and distinct from the visual representations of the ones of the thumbnails.

61. The machine readable medium of claim 60 wherein the step of determining clusters is performed based on at least one factor selected from a group of factors consisting of: (a) a distance between a location of one of the thumbnails and a location of another one of the thumbnails, and (b) distances between the location of said one thumbnail and locations of all other ones of the thumbnails.

62. The machine readable medium of claim 42, including further instructions which, when executed by a machine, perform the further steps of, for a given one thumbnail:

i) determining a degree to which each of the other thumbnails is related to the given one thumbnail; and j) for each of the other thumbnails, if the degree to which it is related to the given thumbnail exceeds a predetermined threshold, generating a visual degree of match indicator, to be rendered on the video display device adjacent to the visual representation of said each other thumbnail, wherein each of the visual degree of match indicators depicts more than two degrees of match.

63. The machine readable medium of claim 42 further comprising machine readable instructions for performing the further steps of:

e) determining clusters of visual representations of ones of the thumbnails located in close proximity to one another; and f) generating a visual indicator of any of the clusters so determined, wherein the visual indicator leaves positions of ones of the thumbnails unchanged.

* * * * *

UNITED STATES PATENT AND TRADEMARK OFFICE
CERTIFICATE OF CORRECTION

PATENT NO. : 6,188,405 B1
DATED : February 13, 2001
INVENTOR(S) : Mary Czerwinski, et al.

It is certified that error appears in the above-identified patent and that said Letters Patent is hereby corrected as shown below:

Column 1,
Line 34, after "use", insert -- of --.

Column 2,
Line 3, replace "a" with -- an --.

Column 3,
Line 21, delete "a".

Column 6,
Line 20, after "allow", insert -- a --.

Column 17,
Line 54, replace "deselected" with -- selected --.

Column 18,
Line 54, replace "poipter" with -- pointer --.

Column 21,
Line 46, change "just-" to -- just --.

Signed and Sealed this

Sixth Day of November, 2001

Attest:

*Nicholas P. Godici*

NICHOLAS P. GODICI
*Attesting Officer*     *Acting Director of the United States Patent and Trademark Office*